(12) United States Patent
Bi et al.

(10) Patent No.: US 12,248,613 B2
(45) Date of Patent: Mar. 11, 2025

(54) DISTRIBUTION-INVARIANT DATA PROTECTION MECHANISM

(71) Applicant: Regents of the University of Minnesota, Minneapolis, MN (US)

(72) Inventors: Xuan Bi, Minneapolis, MN (US); Xiaotong Shen, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 474 days.

(21) Appl. No.: 17/710,145

(22) Filed: Mar. 31, 2022

(65) Prior Publication Data

US 2022/0327238 A1  Oct. 13, 2022

Related U.S. Application Data

(60) Provisional application No. 63/171,828, filed on Apr. 7, 2021.

(51) Int. Cl.
*G06F 21/62* (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 7,237,115 B1* | 6/2007 | Thomas | ..................... | H04L 9/32 713/168 |
| 8,275,204 B1* | 9/2012 | Kovalsky | ........... | G06V 10/7515 382/209 |
| 8,515,058 B1* | 8/2013 | Gentry | ..................... | H04L 9/008 380/28 |
| 2003/0118246 A1* | 6/2003 | August | ...................... | G06T 5/73 382/266 |
| 2003/0135741 A1* | 7/2003 | Nuriyev | ................ | G06F 21/125 713/187 |
| 2005/0021266 A1* | 1/2005 | Kouri | ...................... | G01N 29/11 702/76 |
| 2005/0234686 A1* | 10/2005 | Cheng | ...................... | G06F 17/12 703/2 |
| 2008/0294565 A1* | 11/2008 | Kongtcheu | ............ | G06Q 40/06 705/36 R |
| 2009/0010428 A1* | 1/2009 | Delgosha | .............. | H04L 9/0844 380/30 |

(Continued)

OTHER PUBLICATIONS

Zhu et al., Posson subsampled Renyi differential privacy, International Conference of Machine Learning, 9 pages, 2019.

(Continued)

*Primary Examiner* — Stephen T Gundry
(74) *Attorney, Agent, or Firm* — Theodore M. Magee; Westman, Champlin & Koehler, P.A.

(57) ABSTRACT

A method includes storing a value in data storage so that a third party is prevented from accessing the value, retrieving the value and applying a first transform to the value to form a transformed value having a uniform distribution. Noise is added to the transformed value to form a sum and a second transform is applied to the sum to form a transformed sum having a uniform distribution. An inverse of the first transform is applied to the transformed sum to form a privatized value and the privatized value is provided to the third party.

20 Claims, 5 Drawing Sheets

(56) References Cited

U.S. PATENT DOCUMENTS

| | | | | |
|---|---|---|---|---|
| 2009/0077543 | A1* | 3/2009 | Siskind | G06F 8/447 |
| | | | | 717/136 |
| 2015/0286827 | A1* | 10/2015 | Fawaz | G06F 21/60 |
| | | | | 726/26 |
| 2018/0349605 | A1* | 12/2018 | Wiebe | G06N 20/20 |
| 2019/0065775 | A1* | 2/2019 | Klucar, Jr. | G06F 16/24552 |
| 2019/0312854 | A1* | 10/2019 | Fiske | H04L 9/0852 |
| 2020/0076604 | A1* | 3/2020 | Argones Rua | H04L 9/3278 |
| 2020/0401916 | A1* | 12/2020 | Rolfe | G06N 7/01 |
| 2021/0035002 | A1* | 2/2021 | Hastings | G06F 17/16 |
| 2021/0058241 | A1* | 2/2021 | Georgieva | H04L 9/085 |
| 2021/0133590 | A1* | 5/2021 | Amroabadi | G06N 3/04 |
| 2022/0067505 | A1* | 3/2022 | Liu | G06N 3/08 |
| 2022/0180234 | A1* | 6/2022 | Kamthe | G06N 7/01 |
| 2024/0095392 | A1* | 3/2024 | Damewood | G06F 21/6227 |

OTHER PUBLICATIONS

Abadi et al., Deep learning with differential privacy, In Proceedings of the 2016 ACM SIGSAC Conference on Computer and Communications Security, 14 pages, 2016.

Agarwal et al., cpSGD: communication-efficient and differentially-private distributed SGD, In Advances in Neural Information Processing Systems, 12 pages, 2018.

Alda et al., The Bernstein mechanism: function release under differential privacy, Proceedings of the Thirty-First AAAI Conference on Artificial Intelligence, 7 pages, 2017.

Apple, Learning with privacy at scale, Apple Machine Learning Journal, vol. 1, No. 8, 25 pages, 2017.

Avella-Media, Privacy-preserving parametric inference: A case for robust statistics, Journal of the American Statistical Association, 62 pages, 2019.

Bu et al., Deep learning with Gaussian differential privacy, HHS Public Access, Harv Data Sci Rev, Author manuscript, 40 pages, 2020.

Butucea et al., Interactive versus non-interactive locally differentially private estimation: Two elbows for the quadratic functional, arXi preprint arXi:2003.04773, 49 pages, 2020.

Cai et al., The cost of privacy: Optimal rates of convergence for parameter estimation with differential privacy, arXi preprint arXiv:1902.04495, 55 pages, 2020.

Chaudhuri et al., Differentially private empirical risk minimization, Journal of Machine Learning Research, vol. 12, p. 1069-1109, 2011.

Cormen et al., Introduction to algorithms, Third Edition, MIT press, pp. 148-169, 2009.

Csorgo, Strong approximations of the Hoeffding, Blum, Kiefer, Roseblatt multivariate empirical process, Journal of Multivariate analysis, vol. 9, pp. 84-100, 1979.

Day One Staff, Protecting data privacy: How Amazon is advancing privacy-aware data processing, https://blog.aboutamazon.com/amazon-ai/protecting-data-privacy, 3 pages, 2018.

Demerjian, Rise of the Netflix hacker, https://www.wired.com/2007/03/rise-of-the-netflix-hackers, 2 pages, 2007.

Ding et al., Collecting telemetry data privately, Advances in Neural Information Processing Systems, 10 pages, 2017.

Dong et al., Gaussian differential privacy, arXiv preprint arXiv:1905.02383, 86 pages, 2019.

Duchi et al., Minimax optimal procedures for locally private estimation, Journal of the American Statistical Association, vol. 113, No. 521, 64 pages, 2018.

Durfee, Practical differentially private top-k selection with pay-what-you-get composition, Advances in Neural Information Processing Systems, 11 pages, 2019.

Dwork, Differential privacy, The 33rd International Colloquium on Automata, Languages and Programming, 12 pages, 20006.

Dwork et al., Our data, ourselves: Privacy via distributed noise generation, Annual International Conference on the Theory and Applications of Cryptographic Techniques, pp. 486-503, 2006.

Dwork et al., Calibrating noise to sensitivity in private data analysis, Proceedings of the 3rd Theory of Cryptography Conferences, pp. 265-284, 2006.

Dwork et al., Boosting and differential privacy, IEEE 51st Annual Symposium on Foundations of Computer Science, 10 pages, 2010.

Dwork et al., The algorithmic foundations of differential privacy, Foundations and Trends in Theoretical Computer Science, vol. 9, No. 3-4, pp. 211-407, 2014.

Erlingsson et al., RAPPOR: Randomized aggregatable privacy-preserving ordinal response, Proceedings of the ACM SIGSAC Conference on Computer and Communications Security, pp. 1054-1067, 2014.

Evfimievski et al., Limiting privacy breaches in privacy preserving data mining, Proceedings of the twenty-second ACM SIGMOD-SIGACTSIGART symposium on Principles of database systems, 12 pages, 2003.

Friedman et al., Sparse inverse covariance estimation with the graphical lasso, Biostatistics, vol. 9, No. 3, pp. 432-441, 2008.

Funk, Netflix update: Try this at home, http://sifter.org/~simon/journal/20061211.html, 4 pages, 2006.

Hall et al., Random differential privacy, Journal of Privacy and Confidentiality, vol. 4, No. 2, 12 pages, 2011.

Hall et al., Differential Privacy for Functions and Functional Data, Journal of Machine Learning Research, vol. 14, 23 pages, 2012.

Harper et al., The MovieLens Datasets: History and Context, ACM Transactions on Interactive Intelligent Systems, vol. 5, No. 4, Article 19, 19 pages, 2015.

Kairouz et al., The composition theorem for differential privacy, IEEE Transactions on Information Theory, vol. 63, No. 6, 10 pages, 2017.

Karwa et al., Inference using noisy degrees: differentially private $\beta$-model and synthetic graphs, The Annals of Statistics, vol. 44, No. 1, pp. 87-112, 2016.

Karwa et al., Finite sample differentially private confidence intervals, arXiv preprint arXiv:1711.03908, 51 pages, 2017.

Kasiviswanathan et al., What can we learn privately?, SIAM Journal on Computing, vol. 40, No. 3, 35 pages, 2010.

Kenthapadi et al., PriPeARL: A framework for privacy-preserving analytics and reporting at LinkedIn, 10 pages, 2018.

Lin et al., A Monte Carlo comparison of four estimators of a covariance matrix, Multivariate Analysis, vol. 6, pp. 411-429, 1985.

McSherry et al., Mechanism design via differential privacy, 48th Annual IEEE Symposium on Foundations of Computer Science, 84 pages, 2008.

Ilya Mironov et al., Renyi differential privacy, IEEE 30th Computer Security Foundations Symposium, 13 pages, 2017.

Moro et al., A data-driven approach to predict the success of bank telemarketing, Decision Support Systems, vol. 62, 35 pages, 2014.

Narayanan et al., Robust De-anonymization of large datasets (how to break anonymity of the Netflix prize dataset), arXiv preprint cs/0610105, 24 pages, 2007.

Nayak, New privacy-protected Facebook data for independent research on social media's impact on democracy, https://research.fb.com/blog/2020/02/new-privacyprotected-facebook-data-for-independent-research-on-social-medias-impact-ondemocracy, 2 pages, 2020.

Rohde et al., Geometrizing rates of convergence under local differential privacy constraints, arXiv:1805.01422v2, 72 pages, 2019.

Rudin, Principles of mathematical analysis, International Series in Pure and Applied Mathematics, McGraw-Hill New York, pp. 94-97, 1964.

Shorack, Errata, 55 pages, 2009.

Shorack et al., Empirical process with applications to Statistics, SIAM, Chapter 26, pp. 826-841, 2009.

United States Census Bureau. Disclosure avoidance and the 2020 census. Available at https://www.census.gov/about/policies/privacy/statistical_safeguards/disclosureavoidance-2020-census.html, 2 pages, 2020.

Vadhan, The complexity of differential privacy, In Tutorials on the Foundations of Cryptography, Springer, 95 pages, 2017.

Van der Vaart, Asymptotic statistics, Cambridge Series in Statistical and Probabilistic Mathematics, Cambridge University Press, Chapter 19, pp. 265-266, 1998.

(56) References Cited

OTHER PUBLICATIONS

Wang et al., Subsampled Renyi differential privacy and analytical moments accountant, The 22nd International Conference on Artificial Intelligence and Statistics, 10 pages, 2019.
Wasserman et al., A Statistical framework for differential privacy, Journal of the American Statistical Associate, vol. 105, No. 489, 42 pages, 2010.
Ye et al., Optimal schemes for discrete distribution estimation under locally differential privacy, IEEE Transactions on Information Theory, 15 pages, 2018.

* cited by examiner

DISTRIBUTION-INVARIANT DATA PROTECTION MECHANISM

CROSS-REFERENCE TO RELATED APPLICATION

The present application is based on and claims the benefit of U.S. provisional patent application Ser. No. 63/171,828, filed Apr. 7, 2021, the content of which is hereby incorporated by reference in its entirety.

This invention was made with government support under DMS-1712564, DMS-1721216, DMS-1952539 awarded by the National Science Foundation and GM126002 and HL105397 awarded by the National Institutes of Health. The government has certain rights in the invention.

BACKGROUND

Privacy protection requires released data to satisfy a certain confidentiality standard, for example, differential privacy.

SUMMARY

A method includes storing a value in data storage so that a third party is prevented from accessing the value, retrieving the value and applying a first transform to the value to form a transformed value having a uniform distribution. Noise is added to the transformed value to form a sum and a second transform is applied to the sum to form a transformed sum having a uniform distribution. An inverse of the first transform is applied to the transformed sum to form a privatized value and the privatized value is provided to the third party.

In a further embodiment, a computing device having a memory and a processor executes instructions to perform steps including storing a value in data storage so that a third party is prevented from accessing the value, retrieving the value and applying a first transform to the value to form a transformed value having a uniform distribution. Noise is added to the transformed value to form a sum and a second transform is applied to the sum to form a transformed sum having a uniform distribution. An inverse of the first transform is applied to the transformed sum to form a privatized value and the privatized value is provided to the third party.

In a still further embodiment, a method includes storing values in data storage so that a third party is prevented from accessing the values, the values having a distribution. Noise is then used to form a plurality of privatized values from a plurality of the values in the data storage while ensuring that the privatized values have the same distribution as the distribution of the values in the data storage. Access to the privatized value is then provided to the third party.

DETAILED DESCRIPTION OF ILLUSTRATIVE EMBODIMENTS

Figure 1:
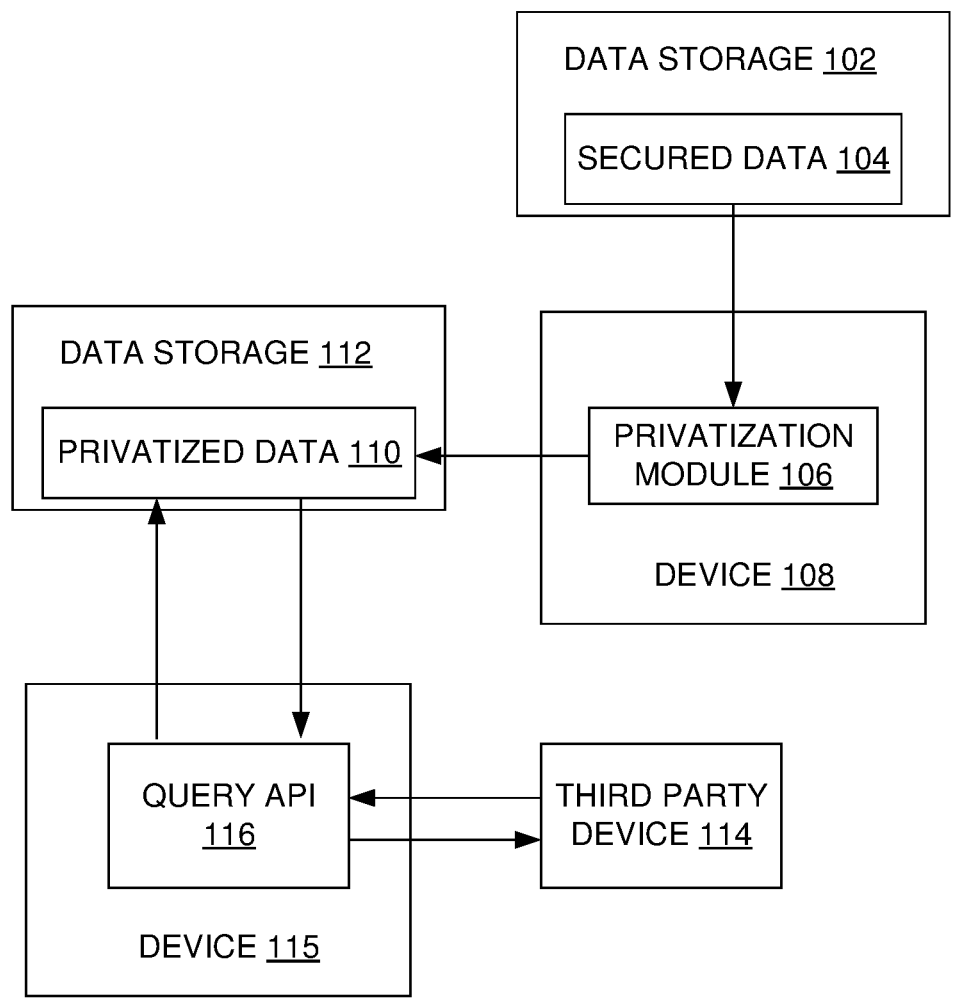
FIG. 1. is a block diagram of a system for privatizing secured values.

Privacy protection requires released data to satisfy a certain confidentiality standard, for example, differential privacy. It becomes increasingly crucial as a large amount of data is collected. To meet the standard of differential privacy, researchers have concentrated on the development of privatization mechanisms. Unfortunately, these mechanisms typically sacrifice statistical accuracy for privacy protection while requiring bounded support of the sample distribution to guard against extreme events. Furthermore, they alter the multivariate structures of an original sample after privatization. Preserving the original data's distribution is essential to any downstream statistical analysis while satisfying differential privacy. Towards this goal, we propose a distribution-invariant privatization mechanism, descriptively named DIP, for independently and identically observations of a vector of variables, not only satisfying differential privacy but also permitting any distribution of continuous, discrete, mixed, and categorical variables, with or without bounded support, regardless of the number of variables. Specifically, DIP perturbs a transformed sample while employing a suitable transformation to the original scale to (approximately) retain the sample distribution. Consequently, any downstream statistical analysis on privatized data can maintain statistical accuracy while being differentially private at any desired level of protection as if it had used the original sample. Numerically, we demonstrate the utility of the proposed method by simulated and benchmark examples and illustrate its advantages over its competitors.

1. Introduction

Data privacy has been increasingly important in the BigData era, where a massive amount of sensitive personal information is collected and stored in a digital form. To protect data privacy and promote data sharing, differential privacy has recently received a lot of attention. Differential privacy mathematically quantifies the notion of privacy for downstream statistical analysis of large datasets, particularly for publicly released data such as the census and survey. It is becoming one gold standard of privacy protection, and many technology companies had adopted it to guard privacy against most extreme events.

There are two main challenges in differential privacy. First, many existing privatized mechanisms alter the sample distribution when satisfying differential privacy. For example, the Laplace mechanism modifies the data distribution and converts count data to negative numerical values. As a result, a downstream analysis may draw dramatically different conclusions based on privatized data. From a statistical perspective, multivariate analysis requires retaining dependency structures for privatized data, namely, distribution-invariant privatization. Second, one needs to impose bounded support of the underlying data distribution to satisfy differential privacy. This requirement is stringent due to a widely used distribution with unbounded support in practice. Yet, it is challenging to develop privatization mechanisms for distribution with unbounded support.

The embodiments provide a novel distribution-invariant privatization (DIP) mechanism to address the above challenges for essentially all types of univariate and multivariate data involving continuous, discrete, mixed, and categorical variables. First, the privatized data produced by DIP, or the DIP privatized sample, approximately preserves the data distribution while satisfying differential privacy, c.f., Theorem 7. Precisely, the DIP privatized data preserves the known data distribution and approximates the unknown data distribution when it is estimated by the empirical distribution on a hold-out sample. Consequently, any downstream privatized statistical analysis and learning will lead to the same conclusion as if the original data were used, which is a unique aspect that existing mechanisms do not enjoy. Moreover, DIP approximately maintains statistical accuracy even with strict privacy protection. By comparison, existing methods suffers from the trade-off between statistical accuracy and the level of privacy protection. These characteristics enable us to treat multivariate problems effectively, including regression, classification, graphical models, clustering, among others. Second, DIP is differentially private even if the underlying distributions have unbounded support due to the proposed nonlinear transformation. Third, DIP's statistical accuracy depends on the accuracy of estimating the unknown data distribution by the empirical distribution. To the best of our knowledge, this is the first attempt to tackle all of the above issues.

Methodologically, DIP transforms a univariate variable into a variable with bounded support and perturbs. Then data perturbation adds the Laplace noise to the transformed variable to ensure differential privacy. Then DIP maps the perturbed variable to the original scale using an inverse distribution function to guarantee invariant transformation. In multiple situations, DIP first factorizes the multivariate distribution into a product of conditional and marginal distributions by the probability chain rule. Then it applies the univariate treatment sequentially to preserve differential privacy and an invariant distribution. This construction enables us to accommodate correlated data and dependency structures in, for example, privatized regression and graphical models. In practice, when the probability distribution is unknown, we estimate an unknown probability distribution by a good estimator, for example, the empirical distribution. Finally, we propose a high-dimensional continualization method to treat continuous data empirically.

Theoretically, we prove that DIP satisfies $\varepsilon$-differential privacy (Definition 1). Numerically, we illustrate DIP with four simulations, including estimation of distributions and parameters, linear regression, and Gaussian graphical models, and on two real-world applications. In numerical examples, DIP compares favorably with strong competitors in terms of statistical accuracy of downstream analysis while maintaining strict privacy protection, including the Laplace mechanism, the exponential mechanism, and the minimax optimal procedure.

Section 2 introduces the notion of differential privacy and the general DIP method. Section 3 considers DIP for univariate continuous variables, whereas Section 4 focuses on univariate discrete variables with a discussion of mixed variables. Section 5 generalizes the univariate variables to the multivariate case. Section 6 is devoted to simulation studies of the operating characteristics of DIP and compares it with other strong competitors in the literature, followed by two real-world applications in Section 7.

2. General Method

2.1 Differential Privacy

Differential privacy concerns a publicly shared dataset by describing the patterns of any subset of data while withholding the information of remaining. Subsequently, we focus on a one-time privatization release problem.

Consider a random sample $(Z_1, \ldots Z_N) \stackrel{iid}{\sim} F$, where F is a cumulative distribution function (cdf) and has support $\mathcal{R}$. Here $\mathcal{R}$ can be bounded or unbounded, for example, $\mathcal{R} = \mathbb{N} \cup \{0\}$ for a Poisson distribution, $\mathcal{R} = \mathbb{R}^p$ for a p-dimensional normal distribution, and $\mathcal{R} = \{0, 1\}^p$ for dummy variables of a categorical variable of (p+1) possible values. For this sample, we randomly partition the original sample into a privatization sample $(Z_1, \ldots Z_n)$ and a hold-out sample $(Z^*_1, \ldots Z^*_m)$, with m=N−n. The privatization sample $(Z_1, \ldots Z_n)$ will be privatized through a privatized mechanism $m(\cdot): \mathcal{R} \to \mathcal{R}$, which generates a new sample $$m(Z) \equiv \tilde{Z} = (\tilde{Z}_1, \ldots, \tilde{Z}_n)^T$$

to release. For notation simplicity, we also write $\tilde{Z}_i = m(Z_i)$; i=1, ..., n. The hold-out sample is not privatized or released, and is reserved for estimating the probability distribution F, if F is unknown. When F is known, we do not need a hold-sample, and have n=N and m=0.

The primary objective of differential privacy is guarding against disclosing the information of data by any alternation of one observation of the data to be released. Suppose z and z' are two adjacent realizations of Z, which differ in only one observation. Then $\varepsilon$-differential privacy is defined as follows:

Definition 1 A privatized mechanism $m(\cdot)$ satisfies $\varepsilon$-differential privacy if $$\sup_{z, z'} \sup_B \frac{P(m(Z) \in B | Z = z)}{P(m(Z) \in B | Z = z')} \leq e^\varepsilon,$$

where $B \subset \mathcal{R}^n$ is a measurable set and $\varepsilon \geq 0$ is a privacy factor or leakage that is usually small. For convenience, the ratio is defined as 1 when the numerator and denominator are 0.

Definition 1 requires that the ratio of conditional probabilities of any privatization event given two adjacent data realizations is upper bounded by $e^\varepsilon$. This definition is stringent because the proximity of two distributions in a certain statistical distance may not meet the criterion in Definition 1, as rare events may drastically increase the probability ratio. It differs from a conventional privacy definition in cryptography.

To make Definition 1 more meaningful in privacy protection, we describe a context of multiple privatized data releases.

Lemma 2 Suppose $\tilde{Z}^{(1)}, \ldots, \tilde{Z}^{(M)}$ are M independent and $\varepsilon$-differentially private copies of Z generated from $m(\cdot)$ as a result of multiple data releases. Then any test based on $\tilde{Z}^{(1)}, \ldots, \tilde{Z}^{(M)}$ with significance level $\gamma > 0$ of $H_0: Z_{i_o} = \mu_0$ versus $H_1: Z_{i_o} = \mu_1$ has power upper bounded by $\gamma e^{M\varepsilon}$ for any $\mu_1 \neq \mu_0$ and any $i_0 = 1, \ldots, n$.

Lemma 2 says that $\varepsilon$-differential privacy protects against data alternation. In particular, it is impossible to reject a null hypothesis $H_0$ that an observation equals to a specific value $\mu_0$ in any sample because of a small power $\gamma e^{M\varepsilon}$ for sufficiently small $\varepsilon$, especially so in a one-time data-release scenario with M=1. However, the information leak could occur when M increases while holding $\varepsilon$ fixed in that $H_0$ is eventually rejected as a result of increased power. Throughout this article, therefore, we focus on the case of M=1.

2.2 Method

This subsection presents the main ideas of DIP and its general form while deferring technical details to Sections 3-5.

Lemma 3 shows that any direct perturbation of $Z_i$ (up to a linear transformation) cannot ensure $\varepsilon$-differential privacy for $Z_i$ with unbounded support.

Lemma 3 Assume that a privatization mechanism $m(\cdot)$ satisfies $m(Z_i)=\beta_0+\beta_1 Z_i+e_i$ for $Z_i \in \mathcal{R} \subset \mathbb{R}^p$, where $\beta_0 \in \mathbb{R}^p$, $\beta_1 \in \mathbb{R}^{p \times p}$ are fixed coefficients with $|\beta_1| \neq 0$, and $e_i \in \mathbb{R}^p$ is a random noise vector, $i=1, \ldots, n$. If $Z_i$ has unbounded support, then $m(\cdot)$ is not $\varepsilon$-differentially private.

This lemma motivates our general treatment of univariate privatization, consisting of three steps. First, we apply an integral transformation to a continuous variable, or a discrete variable after continualization, to yield a uniform distribution. Second, we add a Laplace perturbation to encode the data for differential privacy. Third, we transform the perturbed data by applying an integral transformation, followed by the inverse cdf transformation to retain the data distribution.

DIP's privatized mechanism $m(\cdot)$ for univariate $Z_i$ is written as:

$$\tilde{Z}_i \equiv m(Z_i) = H(C(V_i) + e_i), i = 1, \ldots, n \quad (1)$$

where $e_i \overset{iid}{\sim} \text{Laplace}(0, 1/\varepsilon)$ is random noise, $H(\cdot)$ is a function ensuring the distribution of $\tilde{Z}_i$ following the target distribution for any privacy factor level $\varepsilon > 0$, and $$\begin{cases} C = F \text{ and } V_i = Z_i & \text{if } F \text{ is continuous} \\ C = F_V \text{ and } V_i \text{ is a continualized verion of } Z_i & \text{if } F \text{ is discrete or mixed} \end{cases},$$

and $F_V$ is the cdf of $V_i$. Here $e_i$ follows a Laplace distribution, $C(V_i)$ is bounded, and hence $C(V_i)+e_i$ is differentially private. Note that $H(\ )$ is not a function of $Z$. Subsequently, we provide specific forms of $V_i$, $C$, and $H$.

In general, we develop our privatized mechanism for the multivariate case $Z_i=(Z_{i1}, \ldots, Z_{iq})^T$; $i=1, \ldots n$, where differential privacy is guaranteed regardless of the dimension $q$. In particular, we apply (1) sequentially $$\tilde{Z}_{i1}=m_1(Z_{i1}), \tilde{Z}_{il}=m_l(Z_{il}|\tilde{Z}_{i1}, \ldots, \tilde{Z}_{i,l-1}); l=2 \ldots, q, \quad (2)$$

according to the probability chain rule. It first privatizes $Z_{i1}$ via (1) to yield its privatized $\tilde{Z}_{i1}$, then privatizes $Z_{i2}$ given $\tilde{Z}_{i1}$, and so forth, where $m_l(\cdot)$ denotes the privatization process at sequential step $l$. Note that the order of privatization with respect to the variables of interest does not matter. We defer details to Section 3.3.

One important aspect of (2) is that $\tilde{Z}_i$ preserves the joint distribution of $Z_i$; $i=1, \ldots, n$, and thus any dependency structure of $(Z_{i1}, \ldots, Z_{ip})^T$ therein. As a result, any downstream statistical analysis remains the same for privatized data as if the original data were used. In other words, there is no loss of statistical accuracy for any method based on privatized data.

In practice, $F$ may be unknown and is estimated by $\hat{F}$. However, $\hat{F}$ needs to be independent of $Z$ to satisfy differential privacy on $Z$. Therefore, we construct $\hat{F}$ based on a random hold-out subsample of size $m$ while treating the remaining sample $Z$ of size $n$ to be privately released. Then the results in (1) and (2) continue to be valid provided that $\hat{F}$ is a good estimate of $F$. Also, there is no loss of statistical accuracy asymptotically in the release of $\tilde{Z}$, as long as $\hat{F}$ is consistent for $F$ as $m \to \infty$, c.f., Theorems 8 and 10. However, a small loss may incur depending on the estimation precision of $\hat{F}$ for $F$ in terms of $m$ in a finite situation. Whereas a large $m$ provides a refined estimate of $F$, a large $n$ guarantees a large privatization sample for downstream statistical analysis. See Section 5 for simulations. In general, $m$ needs to be suitably chosen to strike a balance between statistical accuracy and the privatization sample size $n$ when holding $n+m=N$ fixed.

3. Distribution-Invariant Privatization

This section assumes that the true distribution $F$ is known, and hence that all data are privatized and released with $n=N$ and $m=0$.

3.1 Univariate Continuous Distributions

This subsection begins with a simple situation, where $Z_1, \ldots, Z_n \overset{iid}{\sim}$ are univariate continuous variables. By the probability integral transformation, we have $F(Z_i) \overset{iid}{\sim} \text{Unif}(0, 1)$. First we perturb $F(Z_i)$ by adding an independent noise $e_i$ for privatization; $i=1, \ldots, n$. Here $\overset{iid}{\sim} \text{Laplace}(0, b)$ is an independent noise with a pdf $$f_e(t) = \frac{1}{2b} e^{-\frac{|t|}{b}},$$

and $b$ is a privatization parameter to be chosen for the $\varepsilon$-differential privacy. Then we consider $G(F(Z_i)+e_i) \sim \text{Unif}(0, 1)$, where $G$ is the cdf of $F(Z_i)+e_i$; whose expression is given in the supplementary materials. Finally, we apply the inverse function $F^{-1}$ to $G(F(Z_i)+e_i)$. Then, (1) for a continuous variable becomes $$\tilde{Z}_i \equiv m(Z_i) = H(F(Z_i) + e_i), H(\cdot) = F^{-1} \circ G(\cdot) \quad (3)$$

where $\circ$ denotes function composition.

Theorem 4 (Continuous case: Distribution-preservation differential privacy) Let $Z_1, \ldots, Z_n$ be an i.i.d. sample of a continuous probability distribution $F$. Then $\tilde{Z}_1 \ldots \tilde{Z}_n \overset{iid}{\sim} F$ and DIP (3) is $\varepsilon$-differentially private when $b \geq 1/\varepsilon$.

3.2 Univariate Discrete Distributions

This subsection generalizes the result of continuous to discrete variables. We first discuss discrete numerical variable $Z_1, \ldots, Z_n \overset{iid}{\sim} F$, such as binomial, Poisson, geometric, and negative binomial. Now, our strategy for a continuous $H$ in (3) requires modifications to accommodate jumps of $F$. Towards this end, we continualize $F$ by the convolution of $Z_i$ with a continuous variable so that (3) is applicable and then deconvoluting to reconstruct a discrete variable. Specifically, we continualize a step function of a discrete cumulative distribution over its jump points by subtracting a uniform random variable $U_i$ from $Z_i$.

To scrutinize the convolution-deconvolution process, consider an example in which Z is a Bernoulli random variable with $P(Z=1)=P_1>0$. When $U\sim\text{Unif}(0, 1)$ is independent of Z, $V=Z-U$ spreads out point masses at 0 and 1 uniformly over intervals $(-1, 0]$ and $(0, 1]$, respectively. Without loss of generality, we choose left-open and right-closed intervals to avoid overlap. As a result, the cumulative distribution function of V becomes continuous and piecewise linear over $(-1, 1)$, which also agrees with F at the support of Z in a sense that $P(Z\leq k)=P(V\leq k)$; $k=0, 1$. Moreover, this mixed variable V can transform back to follow the original distribution of Z by applying a ceiling function.

In general, let $Z_i$'s support be $\{a_1, \ldots, a_s\} \in \mathbb{R}$, where $a_1 < \ldots < a_s$ can be unequally spaced and $s=\infty$ is permitted. Given $Z_i=a_k$, $V_i$ follows a uniform distribution on $(a_{k-1}, a_k]$ and $V_i$'s are independent; $i=1, \ldots, n$, where, without loss of generality, $a_0 \equiv a_1 - 1$.

Lemma 5 The cumulative distribution function $F_V$ of $V_i$ is written as $$F_V(v) = P_k \cdot \frac{v - a_{k-1}}{a_k - a_{k-1}} + \sum_{t=0}^{k-1} P_t, \text{ for } v \in (a_{k-1}, a_k]$$

where $$P_k = P(Z_i = a_k);$$

$k=1, \ldots, s$. Then $F_V(v)$ is Lipschitz-continuous in v and invertible, and $P(Z_i \leq a_k)=P(V_i \leq a_k)$; $k \geq 0$.

By Lemma 5, H in (1) for a discrete variable is $$\tilde{Z}_i = H(F_V(V_i) + e_i), H = \overline{L} \circ F_V^{-1} \circ G, \quad (4)$$

where $\overline{L}(v) \equiv \inf\{a_k : a_k \geq v\}$ is a generalized ceiling function, and $e_i \overset{iid}{\sim}$ Laplace $(0, b)$.

Theorem 6 (Discrete case: Distribution-preservation differential privacy) Let $Z_1, \ldots, Z_n$ be an i.i.d. sample of a discrete probability distribution F. Then $\tilde{Z}_1, \ldots, \tilde{Z}_n \overset{iid}{\sim} F$ and (4) satisfies $\varepsilon$-differential privacy when $b \geq 1/\varepsilon$.

DIP (4) continues to work for most mixed distributions consisting of both continuous and discrete components. For example, this includes many mixture distributions with finite components. The high-level idea is the same. That is, convert $Z_i$ into a variable $V_i$ with continuous cdf, such that the probability integral transform can still be applied.

Next we work with categorical variables $Z_i \overset{iid}{\sim} F$, which has finite support $\{a_1, \ldots, a_s\} \subset \mathcal{R}$, for example, $\{a_1, \ldots, a_4\}$ represents "red", "yellow", "blue", "green". In the absence of numerical ordering, the treatment of (4) is no longer applicable. Nevertheless, $Z_i$ with s categories can be considered as an $(s-1)$-dimensional multivariate variable, which is a special case of multivariate distributions to discuss in Section 3.3.

3.3 Multivariate Distributions

We are now to expand our univariate result to the multivariate case, which can be applied to regression, classification, graphical models, among others.

Suppose $Z_i \overset{iid}{\sim} F$, where F is a multivariate distribution. Our privatization of $Z=(Z_1, \ldots, Z_n)^T$ with $Z_i=(Z_{i1}, \ldots, Z_{ip})^T$ proceeds sequentially by the probability chain rule in (2), where $m_l(\cdot)$ is one type of univariate DIP mechanisms discussed in Sections 3.1 and 3.2, depending on that of the conditional distribution of $Z_{il}|(\tilde{Z}_{il}, \ldots, \tilde{Z}_{i,l-1})$. Thus, given $(\tilde{Z}_{il}, \ldots, \tilde{Z}_{i,l-1})$, $\tilde{Z}_{il}$ follows the same distribution of $Z_{il}$, implying that $Z_i$ and $\tilde{Z}_i$ i follow the same joint distribution, as indicated in Theorem 7. To guarantee $\varepsilon$-differential privacy for (2), we follow the sequential composition and require $Z_{il}|(\tilde{Z}_{il}, \ldots, \tilde{Z}_{i,l-1})$ to be $\varepsilon/p$-differentially private, that is, $e_{il} \overset{iid}{\sim}$ Laplace$(0, p/\varepsilon)$.

Theorem 7 (Multivariate case: Distribution-preservation and differential privacy) Let $Z_1, \ldots, Z_n$ be an i.i.d. sample from a p-dimensional distribution F. Then $\tilde{Z}_1, \ldots, \tilde{Z}_n \overset{iid}{\sim} F$ and DIP (2) is $\varepsilon$-differentially private provided that b is chosen for satisfying $\varepsilon/p$-differential privacy in each sequential step.

As suggested by Theorem 7, the sequential order of privatization in (2) does not matter. Some natural orders may be preferable from a practical consideration, in, for example, regression of Y on X and chronological order in longitudinal data. To confirm this aspect, we present a linear regression simulation in supplementary materials in the same setting as in Section 5.2 to demonstrate that the sequential order of privatization has little impact on the regression accuracy.

3.4 Univariate Mixed Variables

DIP extends to most mixed distributions consisting of both continuous and discrete components, such as mixture distributions with a finite number of components.

The main idea of privatization remains the same, that is, to convert $Z_i$ into a variable $V_i$ with continuous cdf so that the probability integral transform can apply. We focus on a scenario in which the cdf F contains a series of jump discontinuities. By Darboux-Froda's Theorem, since F is non-decreasing, the set of jump discontinuities is at most countable. Let the set of discontinuities be $\{a_k, k \in Z\} \subset R$, where $a_k < a_{k+1}$ for any $k \in Z$ and $a_0$ denotes the first non-negative jump in that $a_{(-1)} < 0 \leq a_0$.

Recall that in a univariate discrete distribution, $P(a_{k-1} < Z_i < a_k)=0$ and hence the probability mass at $a_k$ can be evenly spread across $(a_{k-1}, a_k]$. In contrast, $P(a_{k-1} < Z_i < a_k) > 0$ for a mixed distribution since $Z_i$ contains both continuous and discrete components. To address this issue, we evenly spread the probability mass at each $a_k$ by "squeezing in" a unit interval to its left.

Our method proceeds as follows. Define $$V_i = \begin{cases} Z_i + k - U_i, & \text{if } Z_i = a_k, k \in Z \\ Z_i + k, & \text{if } Z_i \in (a_k, a_{k+1}), k \in Z \end{cases}$$

where $U_i \overset{iid}{\sim}$ Unif $(0,1)$ and the cdf of $v_i$ is continuous. After privatization of $V_i$ following (3), we acquire the privatized Z as $$\tilde{Z}_i = L_0(\tilde{V}_i) = \begin{cases} \overline{L}(\tilde{V}_i - k), & \text{if } \tilde{V}_i \in [a_k + k - 1, a_k + k] \in Z \\ \tilde{V}_i - k, & \text{if } \tilde{V}_i \in [a_k + k, a_{k+1} + k] \in Z \end{cases}$$

where $\overline{L}(x)=a_k$ for all $x \in [a_k-1, a_k]$. In other words, the DIP mechanism for mixed distributions is $$\tilde{Z}_i = \overline{L} \circ F_V^{-1} \circ G(F_V(V_i) + e_i)$$

Unlike in (4), $P(Z_i \leq a_k) = P(V_i \leq a_k)$ may not be necessarily true for all $k \in Z$. However, $\tilde{Z}_i$ still follows the same distribution as $Z_i$, and the property of $\varepsilon$-differential privacy continues to hold.

4. Distribution-Invariant Privatization for an Unknown F

When F is unknown, we replace it by a consistent estimate $\hat{F}$ of F, such as an empirical distribution function (edf), based on an independent hold-out sample $Z^*$ of F. In this section, we discuss asymptotic properties of DIP with respect to the size of $Z^*$, namely m, going to infinity. Note that each $Z_i$, $i=1, \ldots, n$, is privatized independently, and differential privacy holds for any n.

4.1 Unknown Univariate Distributions

Suppose that $\hat{F}$ is an empirical distribution function based on a hold-out sample $Z^* = z^*$. Note that the probability integral transformation in (3) may not be directly applicable since $\hat{F}$ is not continuous. We construct a continuous cdf $\hat{C}$ that is a continualized version of $\hat{F}$ in order to apply (3).

Construction of $\hat{C}$ given $\hat{F}$. When F is continuous, we assume that $z^*_{(1)} < \ldots < z^*_{(m)}$ are the order statistics of $Z^*$, where "<" holds almost surely. We apply the same construction as in Lemma 5 to yield $$\hat{C}(v) = \frac{1}{m} \cdot \frac{v - z^*_{(k-1)}}{z^*_{(k)} - z^*_{(k-1)}} + \frac{k-1}{m}, \text{ for } v \in (z^*_{(k-1)}, z^*_{(k)}]; k = 1, \ldots, m, \quad (5)$$

where, without loss of generality, $z^*_{(0)} \equiv z^*_{(1)} - 1$. For notation consistency, we let $V^* = Z^*$. When F is discrete, we create a continuous variable $V^*_j$ through continualizing each $Z^*_j$, $j=1, \ldots, m$. Specifically, let $V^*_j$ given $Z^*_j = a_k$ follow a uniform distribution on $(a_{k-1}, a_k]$ as described in Section 3.2. Then $V^*_j$ is continuous. By Lemma 5, $V^*_j \stackrel{iid}{\sim} F_V$. Similarly, let $v^*_{(1)} < \ldots < v^*_{(m)}$ be the order statistics of $V^* = (V^1, \ldots, V^m)^T$. Then (5) applies to $V^*$. A combination of the two cases yields a general expression:

$$\hat{C}(v) = \frac{1}{m} \cdot \frac{v - d_{k-1}}{d_{(k)} - d_{(k-1)}} + \frac{k-1}{m}, \text{ for } v \in (d_{k-1}, d_k]; k = 1, \ldots, m, \quad (6)$$

where $d_k = z^*_{(k)}$ if F is continuous and $d_k = v^*_{(k)}$ if F is discrete, $k=1, \ldots, m$. When F is a mixed distribution, (6) is similarly constructed.

For Z, we generate V similarly as $V^*$ above. Then the mechanism in (1) continues to be applicable through replacing C by $\hat{C}$, that is, $$\tilde{Z}_i \equiv m(Z_i) = H(\hat{C}(V_i) + e_i), H = Lo\hat{C}^{-1}oG, \quad (7)$$

for $i=1, \ldots, n$, where L takes the corresponding form as defined in Section 3, depending on the type of F. Let $\tilde{F}$ be the distribution of $\tilde{Z}_i$. Since $Z_i$'s are i.i.d., we have $\tilde{Z}_1, \ldots, \tilde{Z}_n \stackrel{iid}{\sim} \tilde{F}$.

Theorem 8 DIP (7) satisfies $\varepsilon$-differential privacy on Z when $b \geq 1/\varepsilon$. Furthermore, $\tilde{F}$ is a consistent estimator of F with respect to the Kolmogorov-Smirnov distance, that is, $\sigma(F, \tilde{F}) = sup_{z \in \mathbb{R}} |F(z) - \tilde{F}(z)| \stackrel{a.s.}{\to} 0$ as $m \to \infty$.

Theorem 8 implies that $\tilde{Z}$ follows F when $m \to \infty$. This preserves the original distribution asymptotically. It is also important to note that $\hat{C}$ is built upon the hold-out sample $Z^*$ which is independent of Z. This guarantees that $\hat{C}$ and $\hat{C}^{-1}$ are not functions of Z, which is necessary in the proof of $\varepsilon$-differential privacy.

In addition to empirical distribution functions, Theorem 8 can be generalized to consistent estimators of C. This is useful especially when additional information is available. For example, suppose we know that $Z_1, \ldots, Z_N \stackrel{iid}{\sim} N(\mu, 1)$ where $\mu$ is unknown. Then we can set $\hat{C}$ as the cdf of $$N\left(m^{-1} \sum_{j=1}^{m} Z^*_j, 1\right),$$

which is continuous and is a more refined estimator of F than the continualized empirical distribution function.

A detailed algorithm for the privatization of univariate data with an unknown distribution is summarized in Algorithm 1. We further demonstrate the great scalability of the univariate DIP in Proposition 9. Notice that, although we illustrate privatization for each i in Algorithm 1, most operations are with respect to the vector Z in practice.

---

Proposition 9 The computational complexity of Algorithm 1 is of order $O(N \log N)$ Algorithm 1 A privatized mechanism for DIP with univariate empirical data
   Input: The data Z to be privatized, the hold-out data $Z^*$, and the privacy factor $\varepsilon$
   Convert Z and $Z^*$ into V and V, respectively, as in Section 4.1
   for i = 1, ..., n do
      For each $V_i$, apply (6) and obtain $\hat{C}(V_i)$
      Get the privatized data $\tilde{Z}i$ following (7)
   end for
   Output: Privatized data $\tilde{Z}$

---

4.2 Unknown Multivariate Distributions

Similarly, (2) can be generalized to multivariate empirical distributions when F is unknown. For $Z^* = z^*$, its empirical distribution function is $$\hat{F}(v) = \hat{F}(v_1, \ldots, v_p) = m^{-1} \sum_{j=1}^{m} \prod_{l=1}^{p} \mathbb{1}_{[z^*_{jl}, \infty)}(v_l),$$

where $\mathbb{1}_A(t)$ is an indicator function, with $\mathbb{1}_A(t) = 1$ if $t \in A$ and $\mathbb{1}_A(t) = 0$ otherwise.

Note that (2) cannot be easily obtained for empirical distributions conditional on continuous variables. To address this issue, we propose a multivariate continualization method, which generalizes the univariate continualization method described in Section 4.1. The basic idea is to split the support of $\hat{F}$ into a grid of small p-dimensional cubes, and evenly spread the probability mass of each observation within the cube that is on the immediate bottom-left of the observation. Then for any v in the support of $\hat{F}$, we can find the cube it belongs to, and the corresponding $\hat{C}(v_1)$ and $\hat{C}(v_l | v_1, \ldots, v_{l-1})$, $l=2, \ldots, p$, can be obtained accordingly. On this ground, the sequential privatization mechanism in (2) can be conducted.

We use a two-dimensional case as an example. Suppose F is continuous and we have m=5 observations, namely $z^*_1 =$ $(x_1,y_3), z^*_2=(x_2,y_1), z^*_3=(x_3,y_5), z^*_4=(x_4,y_2)$, and $z^*_5=(x_5, y_4)$, based on which the empirical distribution $\hat{F}$ can be built. For example, $\hat{F}(z_1) = \hat{F}(z_2) = 0.2$, and $\hat{F}(x_5, y_5) = 1$. The continualized empirical distribution $\hat{C}$ is created by spreading the probability mass associated with each observation over a rectangle. We can see that $\hat{C}$ is continuous and agrees with $\hat{F}$ on $z^*_1, \ldots, z^*_5$. Then for an arbitrary $x \in (0, x_5]$, the empirical conditional distribution $\hat{C}(z_2|z_1=x)$ can be calculated. For example, for $x \in (x_2, x_3]$, we have $$\hat{C}(z_2|z_1 = x) = \begin{cases} 1 & \text{if } z_2 > y_5 \\ \frac{z_2 - y_4}{y_5 - y_4} & \text{if } z_2 \in (y_4, y_5] \\ 0 & \text{if } z_2 \leq y_4 \end{cases}$$

And for $z_1 \notin (0, x_5]$, we let $\hat{C}(z_2|z_1) = 0$.

Formally, for each $l=1, \ldots, p$, let $Z^*_l$ denote the lth variable of $Z^*$. If $Z^*_l$ is continuous, we let $V^*_l = Z^*_l$ which has order statistics $v^*_{(1)l} < \ldots < v^*_{(m)l}$ almost surely. In the above example, $v^*_{(j)1} = x_j$ and $v^*_{(j)2} = y_j$; $j=1, \ldots, 5$. If $Z^*_l$ is discrete, $\{a_{1l}, \ldots, a_{s_ll}\}$ is its support. Given $Z^*_{il} = a_{kl}$, we generate $V^*_{il}$ as a uniformly distributed variable on $(a_{(k-1)l}, a_{kl}]$. Then the order statistics of $V^*_l = (V^*_{1l}, \ldots, V^*_{ml})^T$ satisfy $v^*_{(1)l} < \ldots < v^*_{(m)l}$ almost surely. For both continuous and discrete cases, we further let $d_{jl} = v^*_{(j)l}$, $j=1, \ldots, m$, $l=1, \ldots, p$, be the grid. If $Z^*_l$ is mixed, then $d_{jl}$ can be constructed similarly.

For a given $v = (v^1, \ldots, v^p)^T$, we now introduce the conditional cdf $\hat{C}(v_l|v_1, \ldots, v_{l-1})$ for $l=2, \ldots, p$. Suppose there exists $j \in \{1, \ldots, m\}$ such that $(v_1, \ldots, v_{l-1})^T$ is within the smallest cube on the immediate bottom-left of $(V^*_{j1}, \ldots, V^*_{j(l-1)})^T$. For each variable, recall that the order statistics are non-identical almost surely. Then in the holdout sample, such j is unique almost surely. Suppose that the corresponding $V^*_{jl}$ is the qth order statistic of $V^*_l$, that is, $V^*_{jl} = d_{ql}$. Then the conditional distribution can be obtained as $$\hat{C}(v_l|v_1, \ldots, v_{l-1}) = \begin{cases} 1 & \text{if } v_l > d_{ql} \\ \frac{v_l - d_{(q-1)l}}{d_{ql} - d_{(q-1)l}} & \text{if } v_l \in (d_{(q-1)l}, d_{ql}], l = 2, \ldots, p \\ 0 & \text{if } v_l \leq d_{ql} \end{cases} \quad (8)$$

And we let $\hat{C}(v_l|v_1, \ldots, v_{l-1}) = 0$ if there is no observation in the hold-out sample such that the first (l-1) coordinates is the "top-right" corner of the cube in which $(v_1, \ldots, v_{l-1})^T$ is located. For notation simplicity, we write $\hat{C}(v_l|v_1, \ldots, v_{l-1})$ as $\hat{C}_l$.

Now we discuss the privatization of the privatization sample $Z=z$ when $\hat{C}$ is available. We first convert each $Z_{il}$ into $V_{il}$ depending on the type of the lth variable, $i=1, \ldots, n$, $l=1, \ldots, p$. Next, we apply the probability chain rule in (2) to $V_i$ with each $m_l(\cdot)$ being $$\tilde{V}_{il} \equiv m_l(V_{il}) = H_l(\hat{C}_l(V_{il}) + e_i), H_l = \hat{C}_l^{-1} \circ G \quad (9)$$

to yield its privatized version $\tilde{V}_i$. Then we apply $L_l(\tilde{V}_{il})$ for each l to convert $\tilde{V}_i$ back to $\tilde{Z}_i$, where $L_l(\cdot)$ is the ceiling function corresponding to the lth variable of $\tilde{V}_i$, $l=1, \ldots, p$.

Let $\tilde{F}$ be the distribution of $\tilde{Z}_i$. Since $Z_i$'s are i.i.d., we have $\tilde{Z}_1, \ldots, \tilde{Z}_n \stackrel{iid}{\sim} \tilde{F}$.

Theorem 10 DIP (2) using (9) is $\varepsilon$-differentially private provided that b is chosen for satisfying $\varepsilon/p$-differential privacy in each sequential step. Furthermore, $\tilde{F}$ is a consistent estimator of F with respect to the Kolmogorov-Smirnov distance as $m \to \infty$.

As in the univariate cases, we may also consider any consistent estimators of F when additional information is available. Importantly, the multivariate distribution-invariant property in Theorem 10 is invariant with respect to the sequential order of privatization of each variable. Algorithm 2 summarizes the sequential privatization process for multivariate data. Note that Algorithm 2 is directly applicable to categorical variables coded as dummy variables. Meanwhile, (10) and Algorithm 2 continue to be valid even for the high-dimensional case when p>m. Proposition 11 demonstrates the scalability of the multivariate DIP.

It is worth noting that the privacy of raw data in the hold-out sample are also protected. First, any alteration, querying, or release of any raw data in the hold-out sample is not permissible. Second, only a continuous version of the estimated F is constructed, which guarantees that $\hat{F}$ does not contain probability mass of the raw data. This is achieved through adding noise to the raw data in the hold-out sample. Therefore, the privacy protection of a hold-out sample remains at a high standard. (The definition of differential privacy is not applicable to the hold-out sample due to no adjacent realizations being permissible.) Specifically, the probability of identifying a continualized value of a hold-out sample from the privatized data is zero. In other words, there is no privacy leakage for the hold-out sample. Meanwhile, we can also use some public dataset that follows the same distribution F as the hold-out sample, while treating the entire original dataset as the privatization sample. For example, the American Community Survey data are public and the U.S. census data are private, both coming from the same population. The former can serve as a hold-out sample for the latter.

Proposition 11 The Computational Complexity of Algorithm 2 is O(pN log N)

---

Algorithm 2 A chain rule privatized mechanism for DIP with multivariate empirical data
   Input: The privatization sample Z to be privatized, the hold-out sample Z*, and privacy factory $\varepsilon$.
   Convert Z and Z* into V and V*, respectively, as in Section 4.2.
   for i = 1 . . . , n do
     for l = 1 . . . , p do
       Get $\tilde{V}_{il}$ following (9) with $\hat{C}_l$ defined in (8) and b = $\varepsilon$/p.
     end for
     Get the privatized data $\tilde{Z}_i$ with corresponding ceiling functions $L_l$'s.
   end for
   Output: Privatized data $\tilde{Z}$.

---

5. Simulations

This section performs simulations to investigate the operating characteristics of DIP and compare it with some strong competitors in the literature. This includes, the non-private mechanism (NP), the Laplace randomized mechanism (LRM), the optimal procedure of minimaxity (OPM), and the exponential mechanism (EXM). Here NP serves as a benchmark, which yields the best statistical accuracy since no privatization is imposed. LRM is a popular method that adds a Laplace distributed noise to a variable of interest. OPM is defined under local differential privacy. Although its results may not be optimal when applying to $\varepsilon$-differential privacy, it serves as a benchmark. Finally, EXM is among the most popular privatizations especially for discrete variables and is hence compared to in discrete settings.

5.1 Univariate Privatization

Section 5.1 illustrates the distribution preservation property of DIP using continuous and discrete variables with bounded or unbounded support. Here the true distribution F is known with no hold-out samples and hence that n=N.

Continuous Distributions

The first simulation study focuses on the distribution preservation aspect of NP, DIP, LRM, and OPM, as measured by the Kolmogorov-Smirnov distance between the true cdf and the empirical distribution of each method. Moreover, we investigate the robustness with respect to a change of privacy factor ε and sample size n=N.

A random sample $Z_1, \ldots, Z_n \stackrel{iid}{\sim} F$ of size n=1000 is generated according to Unif(0, 1), Beta(2, 5), N(0, 1), or Exp(1). For each ε, privatized $\tilde{Z}=(\tilde{Z}_1, \ldots, \tilde{Z}_n)^T$ is obtained from each of LRM, OPM, and DIP, while $\tilde{Z}=Z$ for NP. For DIP, we use (3) with the corresponding F. Note that LRM and OPM require a bounded domain of F, which is not met by N(0, 1) and Exp(1). For LRM, we use $[-\max(|Z_i|), \max(|Z_i|)]$ and $[0, \max(Z_i)]$; i=1, . . . , n, to respectively approximate the unbounded support of N(0, 1) and Exp(1). Throughout Sections 5 and 6, we conduct all LRM's similarly. For OPM, we consider a privacy mechanism for l2-ball and use $\sqrt{n} \max(|Z_i|)$; i=1, . . . , n, to approximate the true radius there to deal with the unbounded support issue. In this study, the privacy factor ε is set to be 1, 2, 3, 4. The simulation is repeated 1000 times.

26.99=1790%. In contrast, LRM's and OPM's performance deteriorates when a stricter differential privacy policy is imposed by a smaller value of E.

Next, we investigate the impact of the sample size n on the privatization by NP, DIP, OPM, and LPM. DIP gives the best performance among all competitors and essentially agrees with NP, where the small difference is only due to the sampling error of added noise. Importantly, DIP enjoys the large-sample property with its Kolmogorov-Smirnov distance decreasing at the same rate as NP because of its distribution preservation property, Overall, the Kolmogorov-Smirnov distances for OPM and LPM also decrease as n increases, whereas the rate is much lower than the rate of DIP and NP. In fact, the amount of improvement of DIP over OPM and LPM is rather large, ranging from 421% to 2638%. This phenomenon is also attributed to the fact that DIP preserves the distribution of original data whereas OPM and LPM fail to do so. This reinforces our argument that distribution preservation in privatization is critical to statistical analysis.

Discrete Distributions

The second study is concentrated on the distribution preservation aspect of discrete distributions. For DIP, we apply the privatization in (4). For the Laplace framework, as in the continuous case, Laplace noise is added to the response. For OPM, we consider its private mean estimation function under the assumption of the given k-th moment for k=∞. Here k=∞ is adopted since it provides the most accurate results comparing with other values. In an unreported study, the setting when k is finite and slightly greater than 1 is also tested where the random variables are less bounded: The results are less accurate. In addition, we also

TABLE 1

| | | ε | | | |
|---|---|---|---|---|---|
| Distribution | Method | 1 | 2 | 3 | 4 |
| Unif(0,1) | NP | 27.09 (8.40) | 28.01 (8.33) | 26.91 (8.14) | 27.13 (8.13) |
| | DIP | 27.03 (8.01) | 27.47 (8.15) | 27.39 (8.29) | 26.91 (7.85) |
| | LRM | 326.54 (11.40) | 224.93 (9.72) | 166.66 (9.49) | 129.55 (8.44) |
| | OPM | 510.39 (9.24) | 508.39 (9.80) | 507.61 (9.33) | 506.56 (9.15) |
| Beta(2,5) | NP | 27.70 (8.43) | 26.85 (8.08) | 27.13 (8.50) | 27.19 (8.21) |
| | DIP | 26.99 (7.94) | 27.59 (8.06) | 27.51 (7.95) | 27.42 (8.12) |
| | LRM | 384.62 (15.19) | 304.66 (14.76) | 248.44 (13.62) | 205.59 (13.22) |
| | OPM | 510.14 (9.13) | 568.38 (9.48) | 508.02 (9.72) | 507.38 (9.01) |
| N(0,1) | NP | 27.16 (8.28) | 27.08 (8.17) | 26.73 (7.89) | 27.86 (8.51) |
| | DIP | 27.10 (8.09) | 27.24 (8.00) | 27.06 (8.02) | 27.08 (8.22) |
| | LRM | 363.71 (14.58) | 285.12 (16.22) | 228.90 (17.14) | 188.22 (16.72) |
| | OPM | 507.85 (9.65) | 504.92 (9.27) | 504.17 (9.90) | 503.34 (9.47) |
| Exp(1) | NP | 27.37 (8.25) | 27.31 (8.06) | 27.51 (7.90) | 27.65 (8.13) |
| | DIP | 27.62 (8.71) | 26.97 (8.13) | 27.85 (8.46) | 27.92 (8.56) |
| | LRM | 439.61 (17.30) | 392.35 (20.23) | 355.79 (22.60) | 323.98 (23.83) |
| | OPM | 510.54 (9.73) | 508.62 (9.90) | 508.65 (9.79) | 508.29 (9.78) |

As indicated in Table 1, DIP performs the best across 16 situations. By preserving the true distribution, DIP maintains the Kolmogorov-Smirnov distance as small as if a non-private empirical distribution were used, with a small distributional distance across various values of ε for differential privacy. This is because the privatized data $\tilde{Z}$ by DIP retains the same distribution as Z regardless of the value of ε when a known distribution F is used, as implied by Theorem 4. This aligns with our discussions in Section 3 that DIP entails no loss of statistical accuracy when the true distribution F is known. By comparison, the amount of improvement of DIP over LRM ranges from (129.55−26.91)/26.91=381% to (439.61−27.62)/27.62=1492%, while that over OPM is from (507.38−27.42)/27.42=1750% to (510.14−26.99)/ consider the Exponential Mechanism (EXM)—for each element a in the support of a discrete distribution, we choose the quality score function as the number of data points equal to a, and the sensitivity is specified as $\max(Z_i)$. Throughout Sections 5 and 6, we perform all EXM's similarly.

Our goal is to compare the accuracy of each method in terms of distributional parameter estimation. We consider $Z_1, \ldots, Z_n \stackrel{iid}{\sim} F$, where n=1000, and F(·) is chosen from Bernoulli(0.1), Binomial(5, 0.5), Poisson(3), and Geometric (0.2). We calculate the private mean via each framework and estimate the parameter. Then we compare the estimation error with that provided by the non-private estimator. The simulation is repeated 1000 times.

TABLE 2

| Distribution | Method | $\varepsilon$ | | | |
|---|---|---|---|---|---|
| | | 1 | 2 | 3 | 4 |
| Ber(0,1) | NP | 7.60 (5.67) | 7.47 (5.76) | 7.10 (5.59) | 7.93 (5.87) |
| | DIP | 7.46 (5.69) | 7.99 (6.04) | 7.46 (5.67) | 7.50 (5.66) |
| | LRM | 36.01 (28.78) | 19.56 (14.56) | 14.08 (11.01) | 11.94 (9.19) |
| | OPM | 35.44 (27.24) | 20.19 (15.04) | 14.32 (11.03) | 12.39 (9.33) |
| | EXM | 11.34 (8.16) | 10.43 (7.71) | 10.20 (7.76) | 11.05 (8.23) |
| Bin(5,0.5) | NP | 5.58 (4.20) | 5.68 (4.31) | 5.55 (4.20) | 5.56 (4.20) |
| | DIP | 5.61 (4.29) | 5.89 (4.41) | 5.67 (4.27) | 5.86 (4.30) |
| | LRM | 35.48 (28.46) | 19.00 (14.06) | 13.20 (10.08) | 10.70 (8.16) |
| | OPM | 36.19 (27.11) | 18.91 (14.10) | 13.14 (10.03) | 10.51 (8.18) |
| | EXM | 8.39 (6.26) | 7.83 (6.08) | 7.58 (5.93) | 7.90 (5.89) |
| Pois(3) | NP | 43.23 (33.17) | 44.18 (33.14) | 43.05 (31.81) | 43.06 (32.45) |
| | DIP | 43.99 (33.09) | 45.03 (34.32) | 44.36 (33.93) | 44.86 (33.23) |
| | LRM | 354.48 (289.6) | 187.38 (141.77) | 127.02 (98.89) | 100.60 (77.04) |
| | OPM | 352.31 (267.82) | 176.57 (133.99) | 123.39 (94.36) | 94.32 (75.18) |
| | EXM | 64.63 (47.94) | 61.95 (46.27) | 60.70 (45.12) | 60.86 (45.77) |
| Geom(0.2) | NP | 4.56 (3.36) | 4.58 (3.32) | 4.54 (3.44) | 4.44 (3.42) |
| | DIP | 4.39 (3.43) | 4.35 (3.33) | 4.51 (3.32) | 4.47 (3.41) |
| | LRM | 75.72 (300.3) | 25.52 (26.19) | 16.38 (13.81) | 13.03 (10.32) |
| | OPM | 86.69 (695.74) | 25.16 (3.07) | 17.25 (14.75) | 12.66 (10.69) |
| | EXM | 6.20 (4.79) | 6.47 (4.80) | 6.36 (4.75) | 6.30 (4.84) |

As suggested by Table 2, the estimation error of DIP as well as its standard deviation is the best across all settings. Moreover, DIP, through implementing the proposed continualization method and ceiling function, continues to preserve discrete distributions in that it is robust against the change of $\varepsilon$ and incurs only a finite-sample estimation error as in the non-private case. This agrees with our theoretical finding in Theorem 6. In contrast, the competing mechanisms provide relatively larger estimation errors, among which the exponential mechanism has performance closest to DIP. The estimation errors of all competing methods are substantially impacted by the value of $\varepsilon$, where the severity of the impact is least for the exponential mechanism.

Notice that DIP is essentially a perturbation method retaining the similarity between each pair of $Z_i$ and $\tilde{Z}_i$. In other words, $\tilde{Z}_i$ preserves the information about the subject i. In contrast, EXM creates a private sampling scheme, whose privatized data are generated from the estimated distribution and are not necessarily associated with the original subject ID i.

Parameter estimation with respect to the change of sample size is investigated as well. Similar to the results for continuous distributions, DIP has the best performance and the same convergence rate as the non-private estimator. EXM has the second-best results. All other mechanisms enjoy the large sample property as well, but with performance worse than that of DIP.

5.2 Multivariate Privatization

This section performs privatized linear regression, Gaussian graphical model, and graphical lasso to examine the performance of DIP. We assume the true distributions are unknown, and split the data into a hold-out sample (15%, 25%, or 35% of N) and a privatization sample (85%, 75%, or 65% of N).

Linear Regression

Our next study is designed to examine the regression parameter estimation in linear regression for NP, DIP, LRM, and OPM. Let the response variable Y follow $Y = X\beta + e$, where $e_i \overset{iid}{\sim} N(0, 1)$, X is a design matrix, and $\beta$ is a vector of coefficients.

Simulations proceed with N=200 or 2000, the privacy factor $\varepsilon$=1, 2, 3, 4, and a p-dimensional true regression parameter vector $\beta_{p\times 1} = (1, 1, \ldots, 1)^T$ with p=6 or 30. Finally, each ⅓ of X's columns follow independent $N(0, 10^2)$, Poisson(5), and Bernoulli(0.5), respectively.

For DIP, we consider a sample split with a splitting ratio 15%, 25%, 35% of the original sample for hold-out and privatization samples. The reported parameter estimation results are based on linear regression using the privatized release data. We privatize each column of the privatization sample Z:=(X, Y) sequentially following Algorithm (2). For LRM and OPM, we follow the configurations as described in Section 5.1. We utilize the additional information that columns of X is independent, and privatize them independently to yield $\tilde{X}$. We then privatize Y given $\tilde{X}$ through privatizing the corresponding linear regression residuals. Then privatized regression is performed to regress $\tilde{Y}$ against $\tilde{X}$ to obtain an estimated regression parameter vector $\tilde{\beta}$. For all methods, each variable is privatized under a privacy factor $\varepsilon/(p+1)$. The estimation accuracy is measured by the $L_2$ norm of the differences between an estimated and true regression parameter vectors.

TABLE 3

| Setting | Method | $\varepsilon$ | | | |
|---|---|---|---|---|---|
| | | 1 | 2 | 3 | 4 |
| N = 200 | NP | 0.31 (0.16) | 0.31 (0.15) | 0.31 (0.16) | 0.31 (0.15) |
| p = 6 | DIP (hold 15%) | 2.19 (1.15) | 2.16 (1.14) | 2.14 (1.13) | 2.14 (1.14) |
| | DIP (hold 25%) | 1.30 (0.77) | 1.40 (0.75) | 1.42 (0.79) | 1.40 (0.76) |
| | DIP (hold 35%) | 1.13 (0.59) | 1.13 (0.61) | 1.11 (0.62) | 1.12 (0.59) |
| | NLRM | 62.80 (43.28) | 33.53 (21.43) | 24.53 (14.86) | 21.44 (11.91) |
| | NOPM | 757.16 (558.17) | 378.68 (287.99) | 241.05 (190.85) | 184.72 (136.91) |

TABLE 3-continued

| Setting | Method | 1 | 2 | 3 | 4 |
|---|---|---|---|---|---|
| N = 2000 | NP | 0.09 (0.04) | 0.09 (0.04) | 0.09 (0.04) | 0.09 (0.04) |
| p = 6 | DIP (hold 15%) | 0.31 (0.15) | 0.32 (0.15) | 0.31 (0.15) | 0.32 (0.15) |
|  | DIP (hold 25%) | 0.24 (0.12) | 0.24 (0.12) | 0.24 (0.12) | 0.24 (0.11) |
|  | DIP (hold 35%) | 0.21 (0.10) | 0.21 (0.10) | 0.21 (0.10) | 0.20 (0.10) |
|  | NLRM | 19.55 (13.66) | 13.67 (7.94) | 12.30 (6.00) | 11.83 (4.91) |
|  | NOPM | 650.15 (489.16) | 315.75 (240.77) | 219.46 (167.75) | 165.44 (125.28) |
| N = 200 | NP | 0.77 (0.30) | 0.74 (0.30) | 0.76 (0.32) | 0.77 (0.33) |
| p = 30 | DIP (hold 15%) | 21.07 (10.64) | 20.91 (10.68) | 21.03 (10.84) | 21.05 (10.94) |
|  | DIP (hold 25%) | 9.16 (4.41) | 9.17 (4.47) | 9.28 (4.45) | 9.21 (4.46) |
|  | DIP (hold 35%) | 6.15 (2.84) | 6.24 (2.95) | 6.23 (295) | 6.21 (3.00) |
|  | NLRM | 489.43 (370.81) | 250.98 (182.24) | 179.74 (417.89) | 138.68 (90.79) |
|  | NOPM | 6044.5 (4611.4) | 2981.1 (2277.7) | 2021.9 (492.6) | 1542.4 (1118.0) |
| N = 2000 | NP | 0.21 (0.09) | 0.21 (0.08) | 0.21 (0.08) | 0.21 (0.08) |
| p = 30 | DIP (hold 15%) | 1.39 (0.59) | 1.39 (0.59) | 1.40 (0.60) | 1.39 (0.60) |
|  | DIP (hold 25%) | 0.08 (0.38) | 0.88 (0.39) | 0.89 (0.38) | 0.88 (0.39) |
|  | DIP (hold 35%) | 0.73 (0.32) | 0.71 (0.32) | 0.72 (0.31) | 0.72 (0.33) |
|  | NLRM | 209.25 (147.50) | 116.93 (84.48) | 86.97 (57.60) | 74.07 (45.71) |
|  | NOPM | 7822.7 (6055.5) | 4046.6 (3073.2) | 2595.7 (1944.0) | 2052.9 (1522.2) |

As indicated in Table 3, DIP yields the best private estimator of regression coefficient across all situations with a significant amount of improvement on LRM and OPM. Compared with NP, a small difference is seen, which is due to an estimation error of the unknown multivariate cdf in privatization. Meanwhile, there is a trade-off between the hold-out size and statistical accuracy. A large hold-out sample yields a more accurate estimate cdf but reduces the privatization sample size. As suggested by an unreported study, DIP's estimation accuracy improves as an increase of the hold-out size until 50% of the entire sample across all cases. In other words, a reasonable amount of release data is still required to train the desired model. Interestingly, an increased level of the privacy factor ε seems to have a more profound impact on LRM and OPM than on DIP with respect to the estimation error, although their standard errors remain much larger. In contrast, DIP is robust against the change on ε. Overall, the performance of each method improves as the sample size N increases, or the number of regression parameters p decreases. To assess the effect of the order of sequential privatization in (2), we conduct privatized linear regression using DIP with the same setting but in reverse privatization order. Specifically, we let Z:=(Y, $X_{·p}, \ldots, X_{·1}$), that is, we first privatize Y, followed by $X_{·p}$ to $X_{·1}$. The order impact is minimal and the new results are nearly the same or even slightly better in certain settings. This observation agrees with the preservation of the joint distribution in Theorem 10.

Gaussian Graphical Models and the Graphical Lasso

The next example concerns reconstruction of the structure of an undirected graph in a Gaussian graphical model. It will illustrate the importance of the distribution-invariant property of privatization in (2) for estimation of pairwise dependence structures. In this case, $Z_i=(Z_{i1}, \ldots, Z_{ip})^T \stackrel{iid}{\sim} N(0, \Sigma)$, where $\Sigma$ is a known covariance matrix while $\Omega=\Sigma^{-1}$ is the precision matrix. Note that the (k, l)th element of $\Omega$ encodes the partial correlation between $Z_{ik}$ and $Z_{il}$; i=1, ..., N.

Two types of graph networks are considered, namely, the chain and exponential decay networks. For the chain network, $\Omega$ is a tri-diagonal matrix corresponding to the first-order autoregressive structure. Specifically, the (k, l)th element of $\Sigma$ is $\sigma_{kl}=\exp(-0.5|\tau_k-\tau_l|)$, where $\tau_1 < \ldots < \tau_p$ and $\tau_l-\tau_{l-1} \stackrel{iid}{\sim} \text{Unif}(0.5, 1)$; l=2, ..., p. For exponential decay network, the (k, l)th element of $\Omega$ is $\omega_{kl}=\exp(-2|k-l|)$. Clearly, $\Omega$ is sparse in the first case but not in the second.

We now perform simulations. Let N=2000, p=5 or 15, and the privacy factor ε be from 1 to 4. Then we generate a random sample according to the aforementioned cases, followed by privatization by DIP, LRM, and OPM. Finally, the estimated precision matrix $\hat{\Omega}$ will be compared with the true precision matrix $\Omega$ using the entropy loss with $EL(\Omega, \hat{\Omega})=\text{tr}(\Omega^{-1}\hat{\Omega})-\log |\Omega^{-1}\hat{\Omega}|-p$ and the quadratic loss $QL(\Omega, \hat{\Omega})=\text{tr}((\Omega^{-1}\hat{\Omega}-I_p)^2)$. Note that QL=p for LRM and OPM across almost all settings due to close-to-zero $\hat{\Omega}$, and hence the corresponding table is not presented.

For DIP, we consider the same setting as in the previous case. Then (2) is applied, assuming an unknown multivariate cdf, and each variable is privatized with a privacy factor ε/p. For LRM and OPM, we follow the configurations as described in the first part of Section 5.1. The entire sample is released, and each variable is privatized independently under ε/p.

TABLE 4

| Graphical model | | ε | | | |
|---|---|---|---|---|---|
| Setting | Method | 1 | 2 | 3 | 4 |
| Chain Net | NP | 0.01 (0.00) | 0.01 (0.00) | 0.01 (0.00) | 0.01 (0.00) |
| N = 2000 | DIP (hold 15%) | 0.06 (0.02) | 0.06 (0.02) | 0.06 (0.02) | 0.06 (0.02) |
| p = 5 | DIP (hold 25%) | 0.04 (0.01) | 0.04 (0.02) | 0.04 (0.02) | 0.04 (0.02) |
|  | DIP (hold 35%) | 0.03 (0.01) | 0.03 (0.01) | 0.03 (0.01) | 0.03 (0.01) |
|  | NLRM | 37.08 (0.45) | 30.15 (0.44) | 26.08 (0.42) | 23.28 (0.45) |
|  | NOPM | 73.91 (0.43) | 67.07 (0.43) | 63.14 (0.41) | 60.54 (0.43) |

TABLE 4-continued

| Setting | Graphical model Method | 1 | $\varepsilon$ 2 | 3 | 4 |
|---|---|---|---|---|---|
| Chain Net | NP | 0.06 (0.01) | 0.06 (0.01) | 0.06 (0.01) | 0.06 (0.01) |
| N = 2000 | DIP (hold 15%) | 0.51 (0.07) | 0.51 (0.07) | 0.51 (0.08) | 0.51 (0.08) |
| p = 15 | DIP (hold 25%) | 0.34 (0.05) | 0.34 (0.05) | 0.34 (0.05) | 0.34 (0.05) |
|  | DIP (hold 35%) | 0.28 (0.04) | 0.28 (0.04) | 0.28 (0.04) | 0.28 (0.04) |
|  | NLRM | 145.84 (0.82) | 125.09 (0.79) | 112.92 (0.82) | 104.28 (0.78) |
|  | NOPM | 256.25 (0.79) | 235.54 (0.76) | 223.41 (0.80) | 214.84 (0.77) |
| Exp Decay | NP | 0.01 (0.00) | 0.01 (0.00) | 0.01 (0.00) | 0.01 (0.00) |
| N = 2000 | DIP (hold 15%) | 0.06 (0.02) | 0.06 (0.02) | 0.06 (0.02) | 0.06 (0.02) |
| p = 5 | DIP (hold 25%) | 0.04 (0.02) | 0.04 (0.02) | 0.04 (0.02) | 0.04 (0.02) |
|  | DIP (hold 35%) | 0.03 (0.01) | 0.03 (0.01) | 0.03 (0.01) | 0.03 (0.01) |
|  | NLRM | 34.39 (0.40) | 27.46 (0.40) | 23.41 (0.39) | 20.58 (0.40) |
|  | NOPM | 71.22 (0.38) | 64.38 (0.39) | 60.47 (0.38) | 57.84 (0.38) |
| Exp Decay | NP | 0.06 (0.01) | 0.06 (0.01) | 0.06 (0.01) | 0.06 (0.01) |
| N = 2000 | DIP (hold 15%) | 0.52 (0.08) | 0.51 (0.08) | 0.52 (0.08) | 0.51 (0.08) |
| p = 15 | DIP (hold 25%) | 0.34 (0.05) | 0.34 (0.05) | 0.34 (0.05) | 0.34 (0.05) |
|  | DIP (hold 35%) | 0.28 (0.04) | 0.28 (0.04) | 0.28 (0.04) | 0.28 (0.04) |
|  | NLRM | 136.11 (0.70) | 115.30 (0.69) | 103.16 (0.67) | 94.54 (0.67) |
|  | NOPM | 246.52 (0.67) | 225.75 (0.66) | 213.65 (0.64) | 205.10 (0.64) |

As suggested by the top panel of Table 4, DIP has the smallest error of estimating the precision matrix by preserving the underlying dependency structure for both the chain and the exponential decay networks and across different network sizes. Its improvement on competitors is about 1000-fold across all situations in terms of the entropy loss. Moreover, it yields a much smaller standard error when compared with LRM and OPM. Compared with NP, DIP's performance is very close to the non-private precision matrices estimation results, indicating that the dependency structure and the underlying multivariate probability distribution are mostly preserved. A small difference is seen as in the regression case, which is due to an estimation error during the approximation of the unknown multivariate cdf in privatization. In fact, DIP is less sensitive to the value of $\varepsilon$ than LRM and OPM. All these method perform better when p decreases. In summary, DIP's distribution preservation property becomes more critical to recover multivariate structures, which explains a large difference between DIP, and the existing methods.

We perform an additional simulation for graphical lasso in a high-dimensional situation with the graph size p exceeding the sample size N, particularly p=250 and N=200. In this case, the dependence structure in the precision matrices and all other parameters remain the same as in the Gaussian graphical model. We consider a sample split of the original sample for DIP with a ratio 15%, 25%, 35% for a hold-out sample, leaving n=170, 150, 130 for privatization and release. Using the "glasso" package in R and 5-fold cross-validation, we estimate all model and tuning parameters. The tuning parameter is selected through evaluating the log-likelihood on the validation set.

As seen in the bottom panel of Table 4, DIP is the only privatization method that still allows the estimation of the dependence structure. Compared with the non-private graphical lasso, DIP still has good performance despite some estimation errors due to the approximation of the high-dimensional cdf.

6. Real Data Analysis

This section analyzes two sensitive yet publicly available datasets, namely the University of California system salary data and a Portuguese bank marketing campaign data, to understand practical implications of distribution-invariant privatization. In particular, privatized mean is estimated for the salary data while privatized logistic regression is conducted for the bank marketing data. In both examples, the true distributions are unknown, and we use empirical distributions for DIP.

6.1 The University of California Salary Data

Our first study concerns the salary data of the University of California (UC) system, which collect annual salaries of N=252, 540 employees, including faculty, researchers, and staff. For Year 2010, the average salary of all employees is $39,531.49 with a standard deviation $53,253.93. The data is highly right-skewed, with the 90% quantile $95,968.12 and the maximum exceeding two million dollars.

For this dataset, we apply each mechanism to estimate the $\varepsilon$-differentially private mean UC salary. One important aspect is to contrast the privatized mean with the original mean $39,531.49 to understand the impact of privatization on statistical accuracy of estimation. Three privatized mechanisms are compared, including DIP, LRM, and OPM. For DIP, we hold out 15%, 25%, or 35% of the sample, and apply Algorithm 1. For OPM, we follow a private mean estimation function and choose the number of moments k=20 and the moment as the one closest to 3 in order to optimize its performance. The above process, including privatization, is repeated 1000 times.

TABLE 5

| Method | 1 | $\varepsilon$ 2 | 3 | 4 |
|---|---|---|---|---|
| DIP (hold 15%) | 0.50 (0.38) | 0.44 (0.34) | 0.40 (0.31) | 0.37 (0.28) |
| DIP (hold 25%) | 0.40 (0.31) | 0.36 (0.28) | 0.33 (0.25) | 0.30 (0.24) |
| DIP (hold 35%) | 0.36 (0.28) | 0.33 (0.26) | 0.31 (0.24) | 0.29 (0.22) |
| LPM | 13.08 (9.95) | 6.65 (5.04) | 4.62 (3.43) | 3.37 (2.58) |
| OPM | 4.69 (3.44) | 3.03 (2.31) | 2.34 (1.80) | 3.87 (1.39) |

As indicated in Table 5, DIP delivers the most accurate mean salary estimation under differential privacy. The amount of improvement on LPM and OPM is in a range of 405% to 3533%. By comparison, LRM and OPM yield a large estimation error. Note that the performance is attributed primarily to the distribution-invariant property that LPM and OPM do not possess. Moreover, the cost of stricter privacy protection is little for DIP. When ε decreases from 4 to 1, DIP's relative error increases only by 35%, 33%, and 24%, given 15%, 25%, and 35% of the sample held out, respectively. By comparison, those of LRM and OPM increase by 288% and 151%, respectively. This is a result of the impact of the high privatization cost of LPM and OPM on statistical accuracy. In summary, the distribution preservation property is critical to maintaining statistical accuracy in downstream analysis.

6.2 Bank Marketing Data

Our second study examines marketing campaign data of a Portuguese banking institution.

This marketing campaign intends to sell long-term deposits to potential clients through phone conversations. During a phone call, an agent collects a client's personal and demographic data, past contact histories, and if the client is interested in subscribing a term deposit (yes/no). Our goal is to examine statistical accuracy of logistic regression based on privatized data versus the original data.

The campaign data includes the response variable is whether a client has subscribed a long-term deposit. A total of 9 explanatory variables are used, including clients' age (numeric), employment status (yes/no, where "no" includes "unemployed", "retired", "student", and "housemaid"), marital status ("single", "married", and "divorced", which is coded as two dummy variables with "married" being the reference level), education level ("illiterate", "4 years", "6 years", "9 years", "professional course", "high school", and "university", labeled as 0 to 6, respectively), default status (yes/no), housing loan (yes/no), personal loan (yes/no), client's device type ("mobile" or "landline"), and the total number of contacts regarding this campaign. This leads to a total of N=30, 488 complete observations for data analysis, and p=11 variables to be privatized (including the binary response variable and 2 dummy variables for "marital status").

For DIP, we hold out 15%, 25%, or 35% of the sample and apply Algorithm 2 without assuming any underlying true distributions. For OPM, we follow the same procedure as described in Section 5.2, and then conduct private logistic regression following a private estimation of generalized linear models. The privatization process is repeated 1000 times.

TABLE 6

| Method | ε | | | |
|---|---|---|---|---|
| | 1 | 2 | 3 | 4 |
| DIP (hold 15%) | 4.30 (0.40) | 4.80 (0.40) | 4.80 (0.40) | 4.80 (0.40) |
| DIP (hold 25%) | 4.72 (0.31) | 4.73 (0.31) | 4.74 (0.32) | 4.72 (0.31) |
| DIP (hold 35%) | 4.69 (0.27) | 4.71 (0.28) | 4.69 (0.27) | 4.71 (0.28) |
| NLRM | 31.07 (0.42) | 28.85 (0.40) | 26.81 (0.39) | 24.94 (0.37) |
| NOPM | Inf | Inf | Inf | Inf |

As shown in Table 6, parameter estimation based on privatized logistic regression by DIP yields a very small value of the Kullback-Leibler divergence—less than 5× $10^{-2}$. Moreover, its performance is insensitive to the private factor ε, permitting the low cost of strict privacy protection, which is guaranteed by the distribution-invariant property, c.f., Theorem 10. DIP performs slightly better if more data are used in the hold-out sample for empirical cdf estimation. In contrast, the performance of LRM is at least 5 times worse than that of DIP, and the results provided by OPM is infinity, since an estimated probability of 1 or 0 exists across all settings.

7. Discussion

Differential privacy has become a standard of privacy protection as a massive amount of personal information is collected and stored in a digital form. In this paper, we propose a novel privatization method, called DIP, preserving the distribution of original data while guaranteeing differential privacy. Consequently, any downstream privatized statistical analysis or learning leads to the same conclusion as if the original data were used, which is a unique aspect that all existing mechanisms may not enjoy. Second, DIP is differentially private even if underlying variables have unbounded support or unknown distributions. Finally, DIP maintains statistical accuracy even using a strict privacy factor, which is unlike all existing methods that are constrained by the trade-off between statistical accuracy and the level of a privacy factor. Our extensive numerical studies demonstrate the utility and statistical accuracy of the proposed method against strong competitors in literature. Moreover, DIP can be easily generalized to the case of $Z_i \sim F_i$ independently when repeated measurements of Zi are available, as in longitudinal data analysis.

The proposed methodology also opens up several future directions. One direction is to investigate the privacy protection aspect of DIP against a large number of queries, possibly interactive, that is, whether the original data can be retrieved under an extreme scenario. Another direction is to investigate privatization in the presence of missing observations, as in semi-supervised learning.

7.1 Local Differential Privacy

Definition 1 protects data owners' privacy after aggregating all data points to a data server and then applying privatization. In many scenarios, however, data owners may not even trust the data server. To further protect data owners' privacy from the server, one may consider data privatization at each owner's end before aggregation. And the notion of s-local differential privacy is introduced.

Definition 12 A privatized mechanism m(·) satisfies ε-local differential privacy if $$\sup_{z_i, z'_i, B_i} \sup \frac{P(m(Z_i) \in B_i | Z_i = z_i)}{P(m(Z_i) \in B_i | Z_i = z'_i)} \le e^\varepsilon$$

where $B_i \subset \mathcal{R}$ is a measurable set and ε≥0 for i=1, ..., n. The ratio is defined as 1 if the numerator and denominator are both 0.

Lemma 13 If $\tilde{Z}_i$ i=m($Z_i$) satisfies ε-local differential privacy, then $\zeta(\tilde{Z}_i)$ is also ε-locally differentially private for any measurable function $\zeta(\cdot)$.

Based on Lemma 13, the DIP privatization mechanism in (1) and (2) can be extended. Further investigation of DIP is necessary to understand DIP under local differential privacy.

FIG. 1 provides a block diagram of a system 100 for maintaining a level of privacy for secured data while making a version of the data available to the public. In this context, the level of privacy is a measure of the ability of unauthorized third parties to link one of the secured data values to a particular individual. For example, the level of privacy can indicate how hard it is for a third party to determine that a data value indicating that a person has smoked for fifteen years is associated with John Jones.

System 100 includes a secured data storage unit 102 containing secured data 104. Secured data 104 has actual values for variables and may indicate a link between those values and individual entities such as people, companies, universities and the like. Secured data storage unit 102 includes one or more protections against unauthorized access to the values and any links between those values and individual entities stored in data storage unit 102. At a minimum, secure data storage unit 102 requires authentication of people and computer programs that request access to the data in data storage unit 102 before providing access to the data.

Because only a limited number of users are able to access the actual data in secured data storage unit 102, the data is of limited use to others. To make the data of more use to others, a privatization module 106 executed by a processor in a computing device 108 converts values of secured data 104 into privatized data 110. Privatization module 106 then stores privatized data 110 in a data storage unit 112. In some embodiments, data storage units 102 and 112 are a single data storage unit. Privatized data 110 not only obscures the actual values of secured data 104 but also ensures a privacy level for the link between secured data 104 and individual entities. Third parties using a third party device 114 are able to query privatized data 110 through one or more query APIs 116 executed by a processor on computing device 115. In accordance with one embodiment, data storage unit 112 is part of computing device 115.

Figure 2:
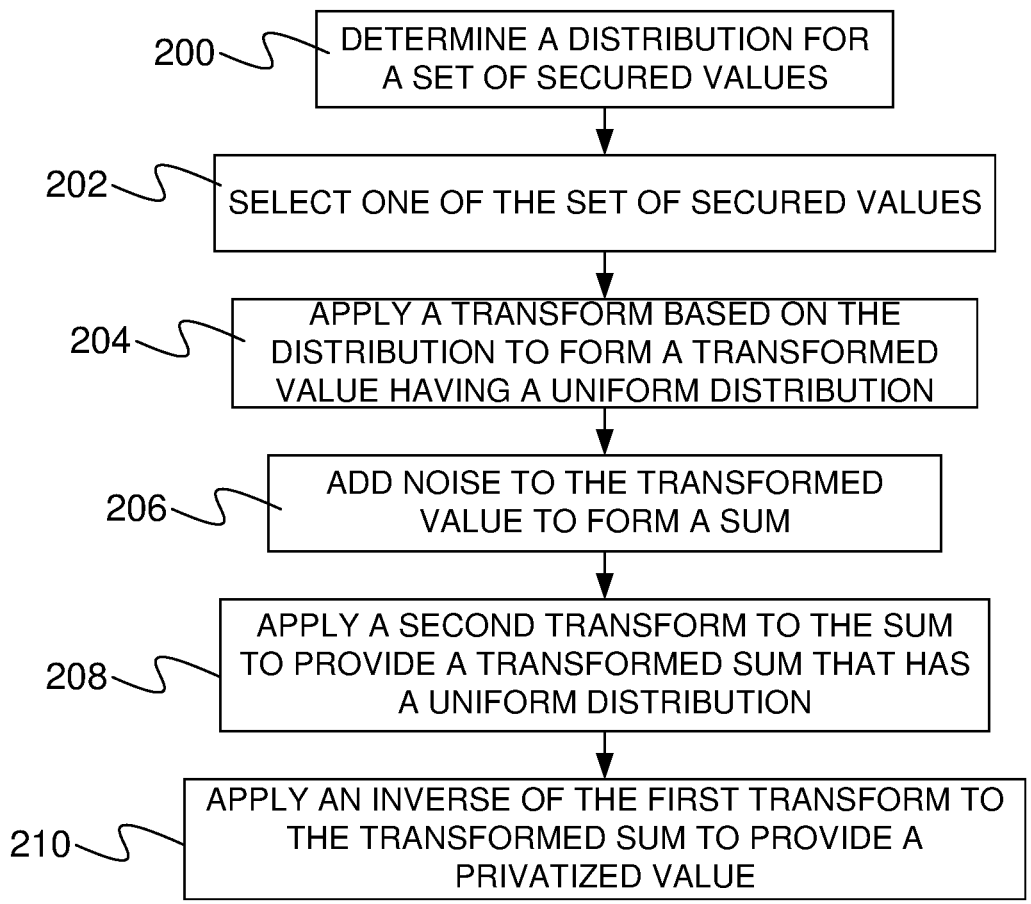
FIG. 2 is a method of privatizing univariate continuous values in accordance with one embodiment.
Figure 3:
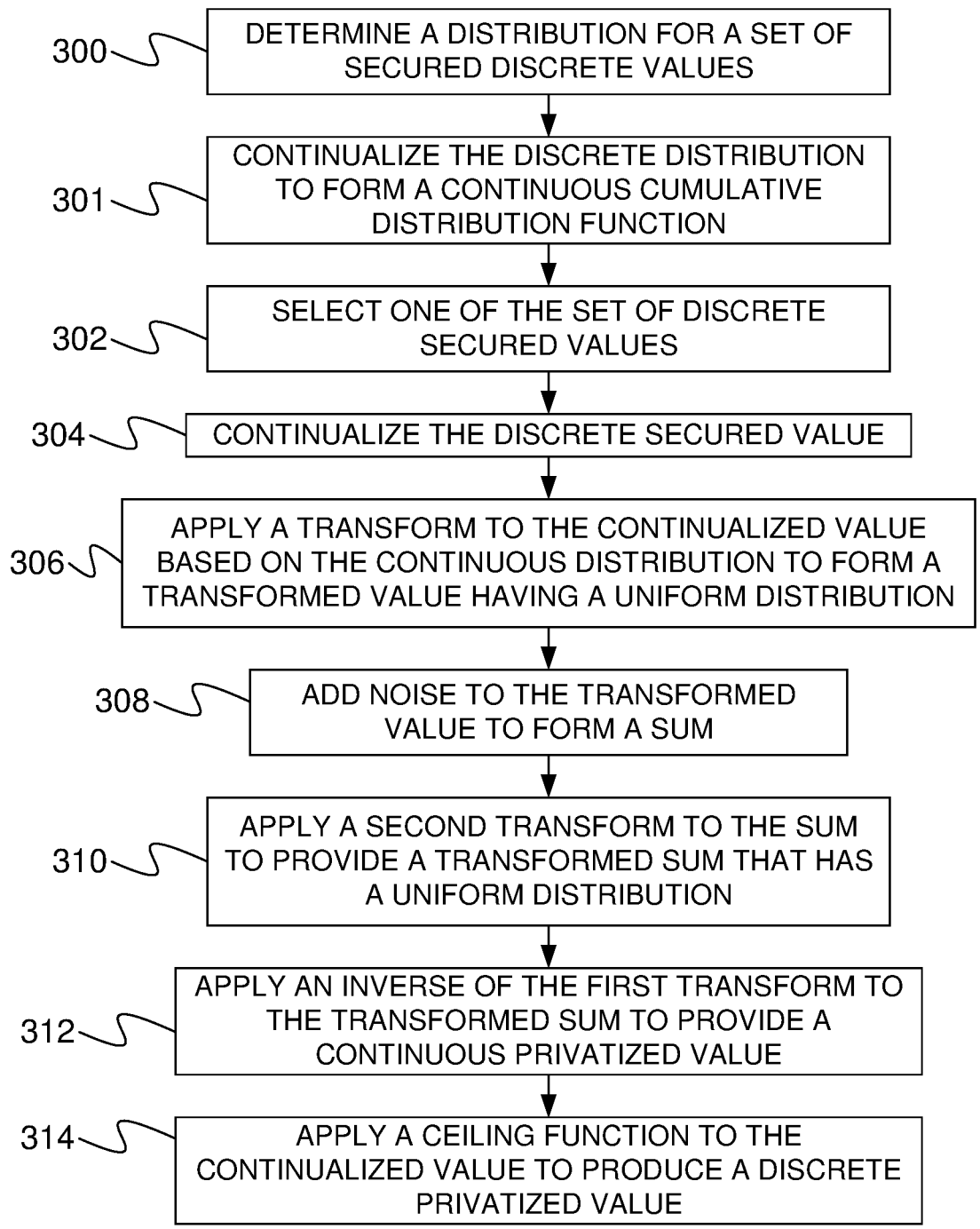
FIG. 3 is a method of privatizing univariate discrete values in accordance with one embodiment.
Figure 4:
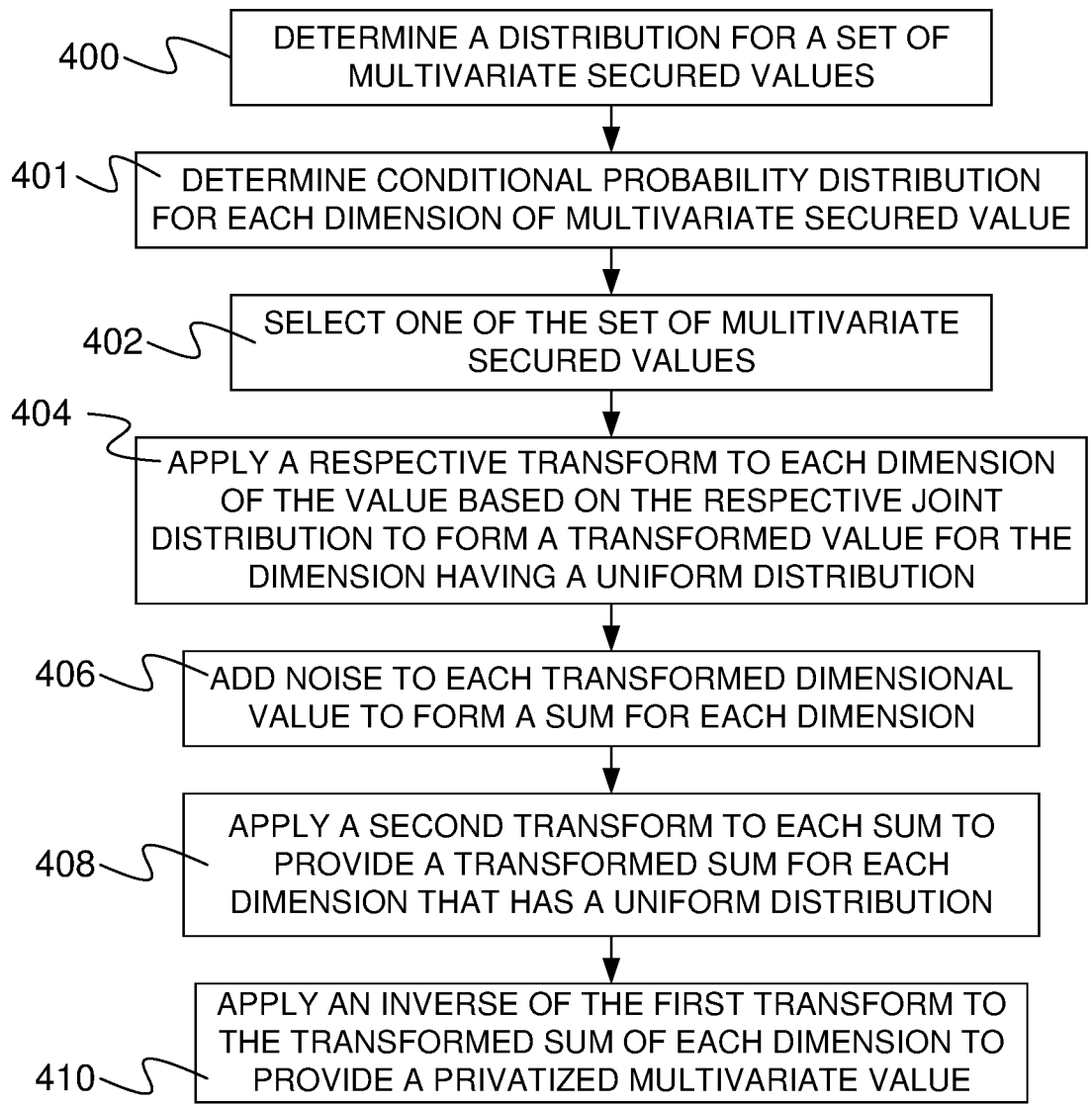
FIG. 4 is a method of privatizing multivariate continuous values in accordance with one embodiment.

FIGS. 2-4 provide methods of privatizing data that are implemented by privatization module 106. Specifically, FIG. 2 provides a method for privatizing continuous univariate variables, FIG. 3 provides a method for privatizing discrete univariate variables, and FIG. 4 provides a method for privatizing continuous multivariate variables.

In step 200 of FIG. 2, a distribution for a set of secured values stored in secured data storage unit 102 is determined. The determined distribution is a cumulative distribution function for a univariate continuous variable and all of the secured values in the set of secured values are values for that variable. The distribution can have bounded or unbounded support.

At step 202, one of the values in the set of secured values is selected and at step 204 a transform based on the distribution is applied to the value to form a transformed value having a bounded uniform distribution between [0,1]. In one particular embodiment, the value is applied to the cumulative distribution function to produce a probability of the value. (See equation 1 above)

At step 206, noise is applied to the transformed value to form a sum. In accordance with one embodiment, the noise is a Laplacian noise. This obscures the transformed value but also causes the resulting sum to have an unbounded distribution. At step 208, a second transform is applied to the sum to provide a transformed sum that has a bounded uniform distribution between [0,1]. In accordance with one embodiment, the second transform involves applying the sum to a cumulative distribution function of the sum to obtain the probability of the sum. At step 210, the inverse of the first transform applied in step 204 is applied to the transformed sum. This produces a privatized value that has a same distribution as the secured value selected at step 202.

FIG. 3 provides a method of forming privatized data from discrete values. In step 300 of FIG. 3, a distribution for a set of secured discrete values stored in secured data storage unit 102 is determined. The determined distribution is a discrete cumulative distribution for a univariate discrete variable and all of the secured values in the set of secured values are values for that variable. The distribution can have bounded or unbounded support.

At step 301, the discrete cumulative distribution is continualized to form a continuous cumulative distribution function. In accordance with one embodiment, the discrete cumulative distribution is continualized by the convolution of the discrete variable with a continuous variable. At step 302, one of the discrete values in the set of secured values is selected and at step 304 the discrete value is continualized by subtracting a random variable having a uniform distribution. At step 306, a transform based on the continuous cumulative distribution determined at step 301 is applied to the continualized value to form a transformed value having a bounded uniform distribution between [0,1]. In one particular embodiment, the continualized value is applied to the continuous cumulative distribution function to produce a probability of the value. (See equation 4 above)

At step 308, noise is applied to the transformed value to form a sum. In accordance with one embodiment, the noise is a Laplacian noise. This obscures the transformed value but also causes the resulting sum to have an unbounded distribution. At step 310, a second transform is applied to the sum to provide a transformed sum that has a bounded uniform distribution between [0,1]. In accordance with one embodiment, the second transform involves applying the sum to a cumulative distribution function of the sum to obtain the probability of the sum. At step 312, the inverse of the first transform applied in step 306 is applied to the transformed sum. This produces a continuous privatized value that has a same distribution as the continualized value determined at step 304. At step 314, a ceiling function is applied to the continuous privatized value to produce a discrete privatized value having a same distribution as the discrete value selected at step 302.

FIG. 4 provides a method of producing privatized data from continuous multivariate variables. In step 400 of FIG. 4, a distribution for a set of multivariate secured values stored in secured data storage unit 102 is determined. At step 401, a respective conditional probability distribution is determined for each dimension of the multivariate secured values.

At step 402, one of the values in the set of secured values is selected and at step 404 a respective transform based on the respective conditional probability distribution of a dimension is applied to the value of each dimension to form a transformed value for each dimension having a bounded uniform distribution between [0,1].

At step 406, noise is applied to the transformed value to form a sum for each dimension. In accordance with one embodiment, the noise is a Laplacian noise. This obscures the transformed value but also causes the resulting sum to have an unbounded distribution. At step 408, a second transform is applied to each sum to provide a transformed sum for each dimension that has a bounded uniform distribution between [0,1]. In accordance with one embodiment, the second transform involves applying the respective sum to a respective cumulative distribution function of the sum to obtain the probability of the sum. At step 410, the inverse of the respective first transform applied in step 404 is applied to the transformed sum of the dimension. This produces a privatized value for each dimension resulting in a privatized multivariate value that has a same distribution as the secured value selected at step 402.

Figure 5:
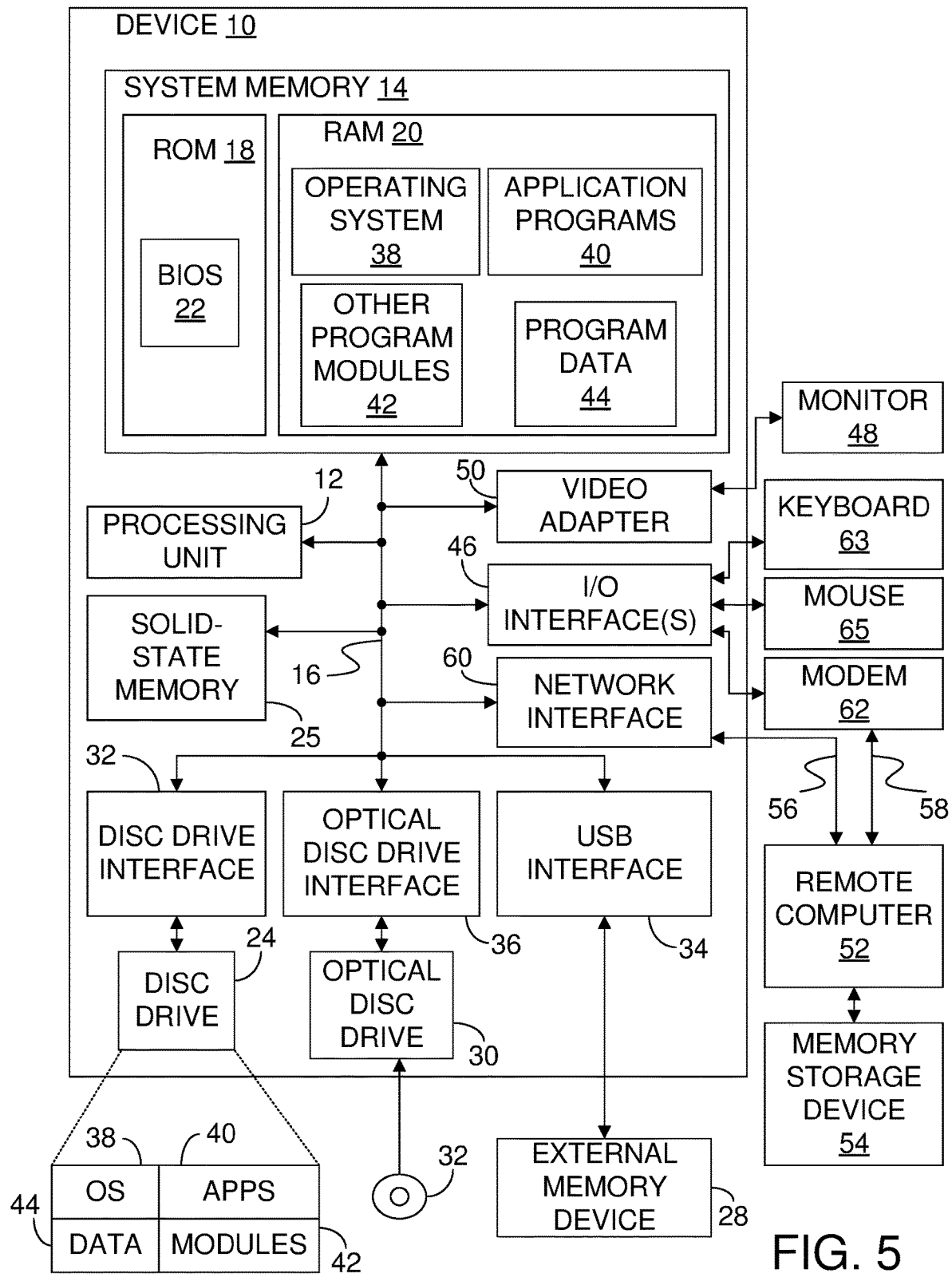
FIG. 5 is a block diagram of an exemplary computing device on which the methods are performed.

FIG. 5 provides an example of a computing device 10 that can be used as a computing device to implement the methods discussed above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of methods discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 5. The network connections depicted in FIG. 5 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 5 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
    storing a plurality of values in data storage so that a third party is prevented from accessing the plurality of values, wherein the plurality of values has a distribution;
    retrieving a value of the plurality of values;
    applying a first transform to the value to form a transformed value having a uniform distribution;
    adding noise to the transformed value to form a sum;
    applying a second transform to the sum to form a transformed sum having a uniform distribution;
    forming a privatized value from the transformed sum such that the privatized value is part of a distribution of privatized values that is the same as the distribution of the plurality of values; and
    providing the privatized value to the third party.

2. The method of claim 1 wherein the distribution of the plurality of values is unbounded.

3. The method of claim 1 wherein the uniform distribution of the transformed value has support from 0 to 1.

4. The method of claim 1 wherein the uniform distribution of the transformed sum has support from 0 to 1.

5. The method of claim 1 wherein the privatized value provides a desired differential privacy.

6. The method of claim 1 further comprising:
    before applying the first transform to the value, continualizing the value to form a continualized value, wherein applying the first transform to the value comprises applying the first transform to the continualized value.

7. The method of claim 6 further comprising:
applying a ceiling function to the privatized value to form a discrete value, wherein providing the privatized value to the third party comprises providing the discrete value to the third party.

8. The method of claim 1 wherein the first transform is based on a joint probability distribution.

9. The method of claim 1 wherein the distribution of the plurality of values is unknown and the first transform is based on an estimate of the unknown distribution.

10. A computer comprising:
a memory; and
a processor executing instructions so as to perform steps comprising:
storing a plurality of values in data storage so that a third party is prevented from accessing the plurality of values, the plurality of values having a distribution;
retrieving a value of the plurality of values;
applying a first transform to the value to form a transformed value having a uniform distribution;
adding noise to the transformed value to form a sum;
applying a second transform to the sum to form a transformed sum having a uniform distribution;
converting the transformed sum into a privatized value such that the privatized value is part of a distribution of privatized values that is the same as the distribution of the plurality of values; and
providing the privatized value to the third party.

11. The computer of claim 10 wherein the distribution of the plurality of values is an unbounded distribution.

12. The computer of claim 10 wherein the uniform distribution of the transformed value has support from 0 to 1.

13. The computer of claim 10 wherein the uniform distribution of the transformed sum has support from 0 to 1.

14. The computer of claim 10 wherein the privatized value provides a desired differential privacy.

15. The computer of claim 10 wherein the processor performs a further step comprising:
before applying the first transform to the value, continualizing the value to form a continualized value, wherein applying the first transform to the value comprises applying the first transform to the continualized value.

16. The computer of claim 15 wherein the processor performs a further step comprising:
applying a ceiling function to the privatized value to form a discrete value, wherein providing the privatized value to the third party comprises providing the discrete value to the third party.

17. A method comprising:
storing values in data storage so that a third party is prevented from accessing the values, the values having a distribution;
retrieving a value from data storage;
applying a first transform to the value to form a transformed value such that the transformed value is part of a uniform distribution of transformed values;
using noise to form a privatized value from the transformed value a while ensuring that the privatized value is part of a distribution of privatized values that is the same as the distribution of the values in the data storage; and
providing access to the privatized value to the third party.

18. The method of claim 17 wherein using noise to form the privatized values comprises:
adding noise to the transformed value to form a sum;
applying a second transform to the sum to form a transformed sum having a uniform distribution; and
applying an inverse of the first transform to the transformed sum to form the privatized value.

19. The method of claim 18 further comprising:
before applying the first transform to the value, continualizing the value to form a continualized value, wherein applying the first transform to the value comprises applying the first transform to the continualized value.

20. The method of claim 19 further comprising:
applying a ceiling function to the privatized value to form a discrete value, wherein providing the privatized value to the third party comprises providing the discrete value to the third party.

* * * * *